US012571476B2

(12) United States Patent (10) Patent No.: US 12,571,476 B2

Muto et al. (45) Date of Patent: Mar. 10, 2026

(54) FLOW PATH SWITCH VALVE

(71) Applicant: DENSO CORPORATION, Kariya-city (JP)

(72) Inventors: Naito Muto, Kariya-city (JP); Naoya Makimoto, Kariya-city (JP); Yasuhiro Yokoo, Kariya-city (JP); Yoshiki Kato, Kariya-city (JP); Takuya Hamada, Kariya-city (JP); Akira Higuchi, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 2 days.

(21) Appl. No.: 18/882,397

(22) Filed: Sep. 11, 2024

(65) Prior Publication Data

US 2025/0003508 A1 Jan. 2, 2025

Related U.S. Application Data

(63) Continuation of application No. PCT/JP2023/006846, filed on Feb. 24, 2023.

(30) Foreign Application Priority Data

Mar. 15, 2022 (JP) ................................. 2022-040192

(51) Int. Cl.
F16K 11/074 (2006.01)
F16K 11/085 (2006.01)
F16K 27/04 (2006.01)

(52) U.S. Cl.
CPC .......... F16K 11/074 (2013.01); F16K 27/045 (2013.01); F16K 11/0856 (2013.01)

(58) Field of Classification Search
CPC ... F16K 11/074; F16K 11/0856; F16K 27/045
See application file for complete search history.

(56) References Cited

U.S. PATENT DOCUMENTS 3,911,956 A * 10/1975 LeBreton ............ F16K 11/0743
210/411
11,913,684 B2 * 2/2024 Makihara ................ F16K 3/314

FOREIGN PATENT DOCUMENTS

JP 2020200943 A 12/2020

* cited by examiner

*Primary Examiner* — Michael R Reid
(74) *Attorney, Agent, or Firm* — Nixon & Vanderhye P.C.

(57) ABSTRACT

A housing forms: a first space and a second space; and a third space that is placed on one side relative to the first space and the second space in one direction. A primary partition partitions between the first space and the second space, and secondary partitions partition the first space into a plurality of subspaces. A valve element has: a first communication passage extending through the valve element in the one direction; and a second communication passage recessed on the valve element from another side toward the one side in the one direction. In response to movement of the valve element, the valve element changes a subspace to be communicated with the third space through the first communication passage among the plurality of subspaces and also changes another subspace to be communicated with the second space through the second communication passage among the plurality of subspaces.

5 Claims, 16 Drawing Sheets

FIG. 9

FLOW PATH SWITCH VALVE

CROSS REFERENCE TO RELATED APPLICATIONS

This application is a continuation application of International Patent Application No. PCT/JP2023/006846 filed on Feb. 24, 2023, which designated the U.S. and claims the benefit of priority from Japanese Patent Application No. 2022-40192 filed on Mar. 15, 2022. The entire disclosures of all of the above applications are incorporated herein by reference.

TECHNICAL FIELD

The present disclosure relates to a flow path switch valve configured to conduct a fluid.

BACKGROUND

A previously proposed flow path switch valve includes: a main body that has an inner chamber; and a partition that partitions the inner chamber into a plurality of compartment chambers. The main body of the flow path switch valve has a plurality of inflow ports for inputting a coolant and a plurality of outflow ports for outputting the coolant. All of the inflow ports and the outflow ports are communicated with the inner chamber. The partition of the flow path switch valve can be moved relative to the main body. The partition is moved relative to the main body to change a correspondence between a corresponding one of the inflow ports and a corresponding one of the outflow ports which are communicated with each other through a corresponding one of the compartment chambers.

SUMMARY

This section provides a general summary of the disclosure, and is not a comprehensive disclosure of its full scope or all of its features.

According to the present disclosure, there is provided a flow path switch valve that includes a housing and a valve element. The housing internally forms: a first space and a second space that are configured to conduct a fluid; and a third space that is placed on one side relative to the first space and the second space in one direction and is configured to conduct the fluid. The housing includes: a primary partition that partitions between the first space and the second space; and a plurality of secondary partitions that partition the first space into a plurality of subspaces. The valve element has a first communication passage and a second communication passage. The first communication passage is placed on the one side relative to the first space in the one direction. The second communication passage is recessed on the valve element from another side, which is opposite to the one side in the one direction, toward the one side in the one direction. The second communication passage is placed on the one side relative to the first space and the second space in the one direction. In response to movement of the valve element relative to the housing, the valve element changes a subspace to be communicated with the third space through the first communication passage among the plurality of subspaces and also changes another subspace to be communicated with the second space through the second communication passage among the plurality of subspaces.

BRIEF DESCRIPTION OF DRAWINGS

The drawings described herein are for illustrative purposes only of selected embodiments and not all possible implementations, and are not intended to limit the scope of the present disclosure.

FIG. 9 is a longitudinal cross-sectional view corresponding to FIG. 1, schematically showing a structure of a flow path switch valve according to a third embodiment.

DETAILED DESCRIPTION

Figure 1:
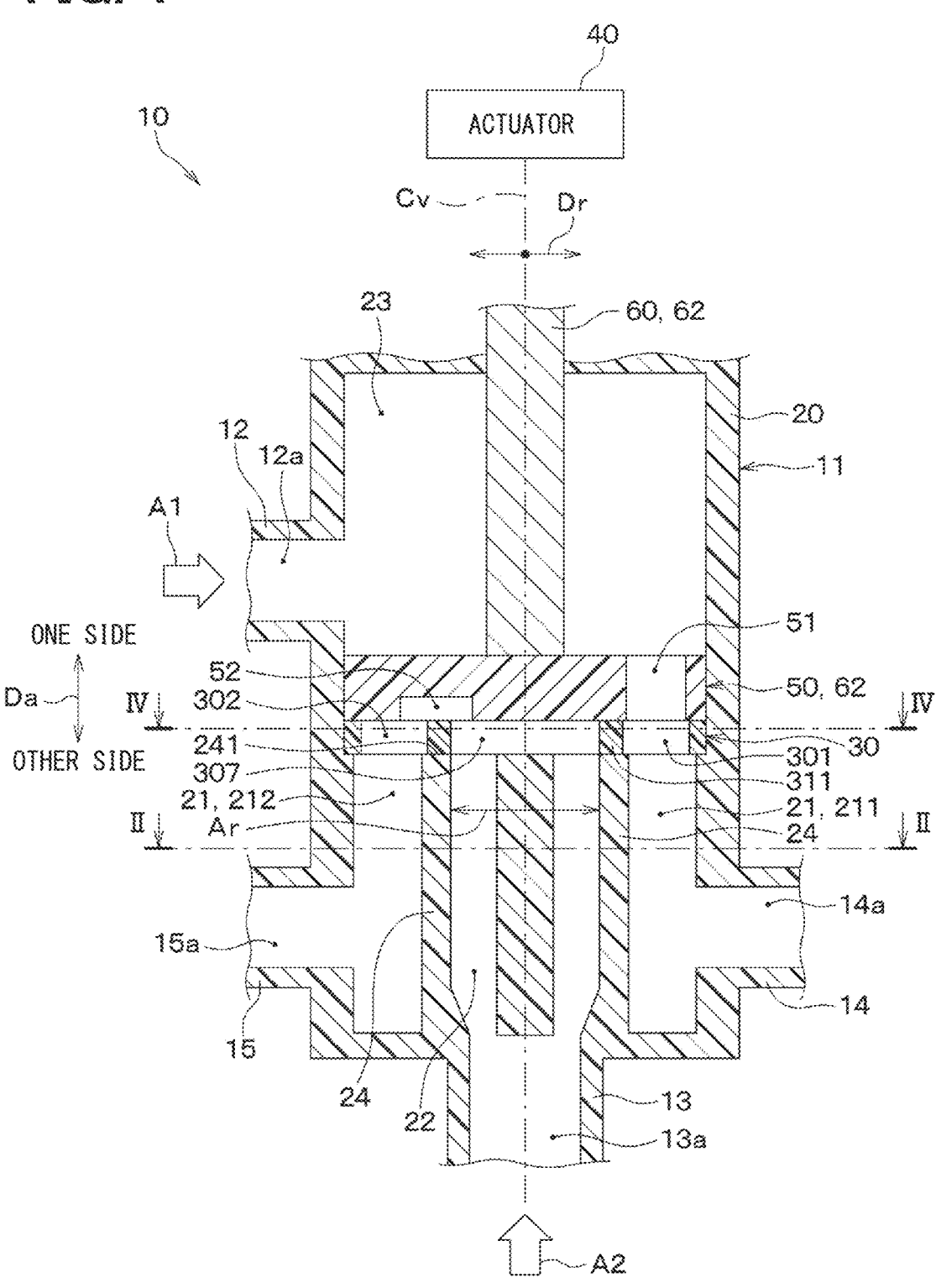
FIG. 1 is a longitudinal cross-sectional view schematically showing a structure of a flow path switch valve according to a first embodiment.

A previously proposed flow path switch valve includes: a main body that has an inner chamber; and a partition that partitions the inner chamber into a plurality of compartment chambers.

The main body of the flow path switch valve has a plurality of inflow ports for inputting a coolant and a plurality of outflow ports for outputting the coolant. All of the inflow ports and the outflow ports are communicated with the inner chamber. The partition of the flow path switch valve can be moved relative to the main body. The partition is moved relative to the main body to change a correspondence between a corresponding one of the inflow ports and a corresponding one of the outflow ports which are communicated with each other through a corresponding one of the compartment chambers.

In recent years, in order to improve a cruising range of a vehicle, for example, a plurality of heat exchangers are connected to in-vehicle devices in a fluid circulation circuit, whereby waste heat from the in-vehicle devices is used to improve the efficiency of air conditioning of the vehicle.

However, the fluid circulation circuit, which connects the heat exchangers to the in-vehicle devices, requires a large number of flow path switch valves, resulting in an increase in the number of components and, consequently, in costs. Furthermore, an actual fluid circulation circuit is configured differently, for example, for each vehicle model in which the fluid circulation circuit is used.

Therefore, not only the technology discussed above, but also another technology related to another flow path switch valve is required as a technology that enables multiple flow paths to be changed among a plurality of flow paths with a simple structure. As a result of the diligent study of the inventors of the present application, the above finding is made.

According to one aspect of the present disclosure, there is provided a flow path switch valve that includes:

a housing that internally forms:
  a first space and a second space that are configured to conduct a fluid; and
  a third space that is placed on one side relative to the first space and the second space in one direction and is configured to conduct the fluid, wherein the housing includes:
a primary partition that partitions between the first space and the second space; and
a plurality of secondary partitions that partition the first space into a plurality of subspaces, wherein the plurality of subspaces are arranged adjacent to the second space, and the primary partition is interposed between: the plurality of subspaces; and the second space; and
a valve element that is placed at an inside of the housing and partitions between: the third space; and the first space and the second space, wherein:
the valve element has:
a first communication passage that is placed on the one side relative to the first space in the one direction and overlaps with the first space in the one direction, wherein the first communication passage extends through the valve element in the one direction; and
a second communication passage that is recessed on the valve element from another side, which is opposite to the one side in the one direction, toward the one side in the one direction, wherein the second communication passage is placed on the one side relative to the first space and the second space in the one direction and overlaps with the first space and the second space in the one direction;
the plurality of subspaces, the second space and the third space are respectively configured to be connected to an outside of the housing; and
in response to movement of the valve element relative to the housing, the valve element changes a subspace to be communicated with the third space through the first communication passage among the plurality of subspaces and also changes another subspace to be communicated with the second space through the second communication passage among the plurality of subspaces.

With the above configuration, it is possible to simultaneously change the flow path, which passes through the first communication passage, and the flow path, which passes through the second communication passage, by moving the valve element without complicating the structure of the valve element. Therefore, the multiple flow paths can be changed with the simple structure among the plurality of flow paths.

Hereinafter, each of embodiments will be described with reference to the drawings. In the following respective embodiments, portions, which are the same or equivalent to each other, will be indicated by the same reference signs.

First Embodiment

Figure 2:
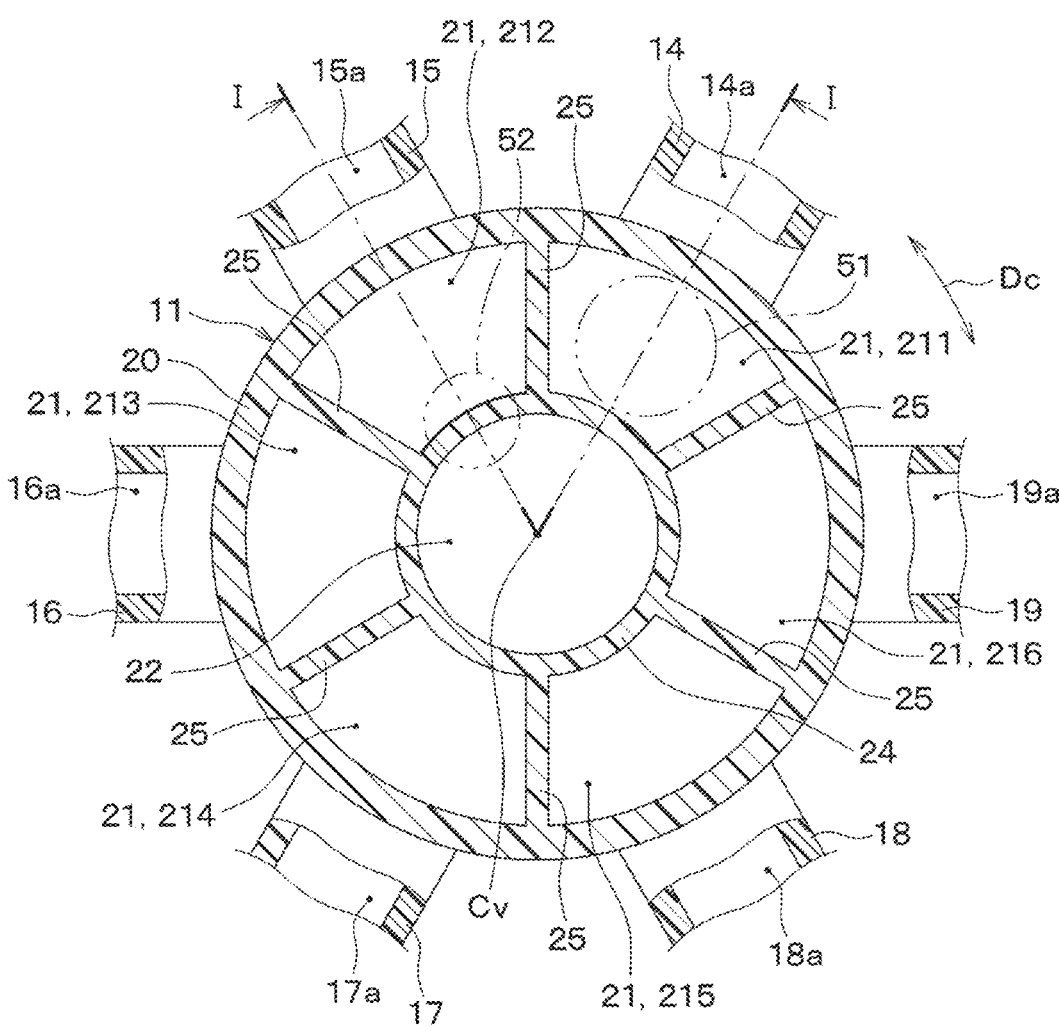
FIG. 2 is a cross-sectional view taken along line II-II in FIG. 1.

A flow path switch valve 10 of the present embodiment is a valve device that is for a vehicle and is installed at, for example, a hybrid vehicle. The flow path switch valve 10, which is shown in FIGS. 1 and 2, forms a part of a heat medium circuit that circulates a heat medium to, for example: an internal combustion engine for running the vehicle; an electric motor for running the vehicle; a power control unit that controls an electric power supplied to the electric motor; and a heat exchanger of an air conditioning apparatus. Therefore, the heat medium, which is circulated through the heat medium circuit, flows through the flow path switch valve 10.

The flow path switch valve 10 can change or block a flow path in the heat medium circuit. The heat medium, which flows through the flow path switch valve 10, is a fluid in a form of a liquid. For example, a water-based coolant containing ethylene glycol is used as the heat medium. The power control unit may also be referred to as a PCU for short.

Figure 3:
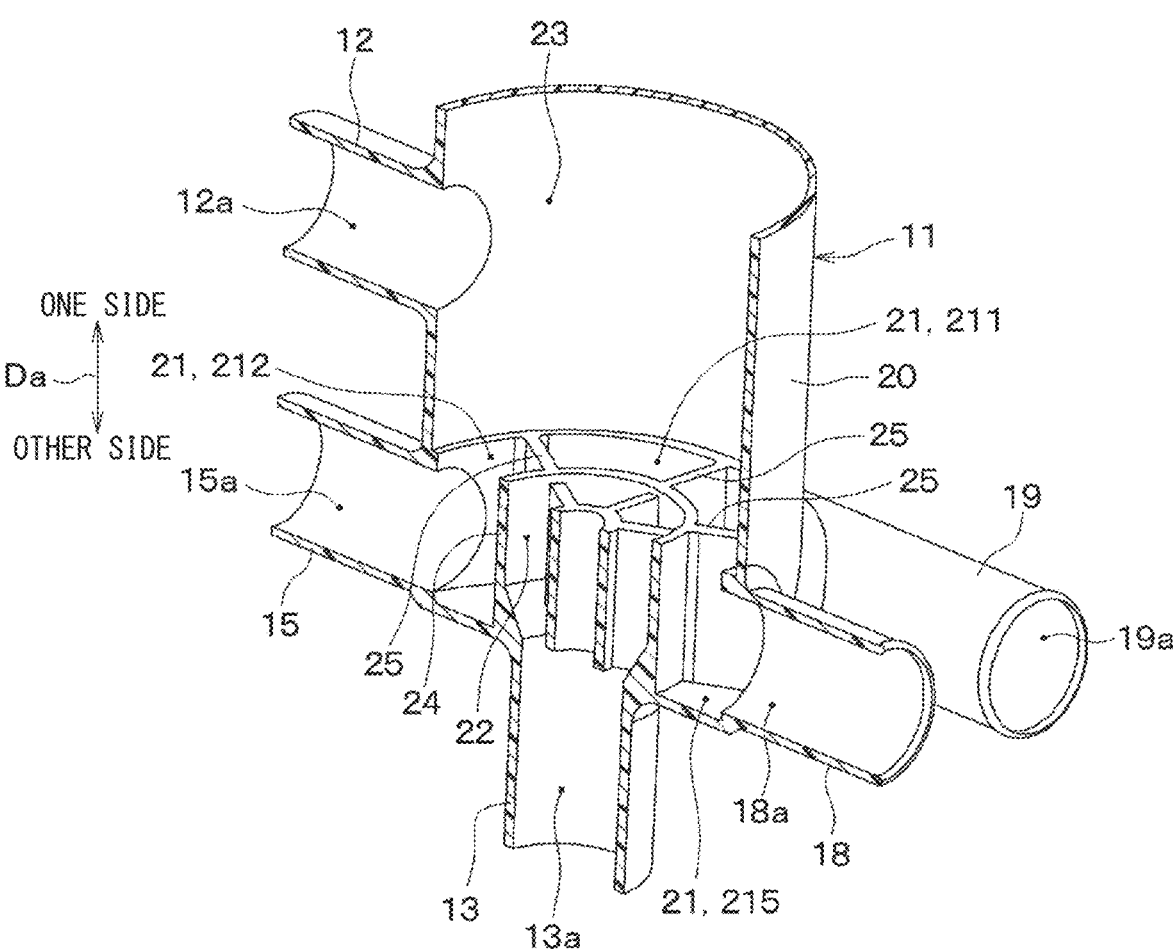
FIG. 3 is a perspective cross-sectional view of a housing of the flow path switch valve according to the first embodiment.

Specifically, as shown in FIGS. 1 to 3, the flow path switch valve 10 is a disc valve that changes the flow path of the heat medium by rotating a rotor 50, which is shaped generally in a circular plate form, about a predetermined operational central axis Cv. The flow path switch valve 10 is a multi-way valve having a plurality of connection ports 12a-19a that are connected to the outside of the flow path switch valve 10. For example, in the present embodiment, since the flow path switch valve 10 has the eight connection ports 12a-19a, the flow path switch valve 10 is an eight-way valve.

In the description of the present embodiment, an axial direction of the operational central axis Cv may be referred to as a valve axial direction Da, which corresponds to one direction of the present disclosure. Furthermore, a radial direction of the operational central axis Cv may be referred to as a valve radial direction Dr, and a circumferential direction about the operational central axis Cv may be referred to as a valve circumferential direction Dc. FIG. 1 is a cross-sectional view taken along line I-I in FIG. 2. Furthermore, an upper side of a plane of FIG. 1 is defined as one side in the valve axial direction Da, and a lower side of the plane of FIG. 1 is defined as the other side in the valve axial direction Da.

The flow path switch valve 10 includes a housing 11, a stator 30, an actuator 40, the rotor 50 and a shaft 60.

The housing 11 is an outer shell member that forms an outer shell of the flow path switch valve 10. The housing 11 is a non-rotatable member that does not rotate, and the housing 11 is made of, for example, resin. The housing 11 receives the stator 30, the rotor 50 and the shaft 60 at an inside of the housing 11. For example, the housing 11 may be formed by a single component or a plurality of components.

The housing 11 has a first connection port forming portion 12, a second connection port forming portion 13, a third connection port forming portion 14, a fourth connection port forming portion 15, a fifth connection port forming portion 16, a sixth connection port forming portion 17, a seventh connection port forming portion 18, an eighth connection port forming portion 19 and a housing main body 20.

The housing main body 20 is shaped in a tubular form that extends in the valve axial direction Da. Two opposite ends of the housing main body 20 shaped in the tubular are closed, except for a portion of the end of the housing main body 20 where the connection port is formed.

Furthermore, each of the first to eighth connection port forming portions 12, 13, 14, 15, 16, 17, 18, 19 is shaped in a tubular form that outwardly projects from the housing main body 20. For example, the second connection port forming portion 13 projects from the end of the housing main body 20, which faces the other side in the valve axial direction Da, toward the other side in the valve axial direction Da. Furthermore, each of the first and third to eighth connection port forming portions 12, 14, 15, 16, 17, 18, 19 projects outwardly from an outer peripheral surface of the housing main body 20.

A first connection port 12a is formed at an inside of the first connection port forming portion 12, and a second connection port 13a is formed at an inside of the second connection port forming portion 13, and a third connection port 14a is formed at an inside of the third connection port forming portion 14. A fourth connection port 15a is formed at an inside of the fourth connection port forming portion 15, and a fifth connection port 16a is formed at an inside of the fifth connection port forming portion 16, and a sixth connection port 17a is formed at an inside of the sixth connection port forming portion 17. Furthermore, a seventh connection port 18a is formed at an inside of the seventh connection port forming portion 18, and an eighth connection port 19a is formed at an inside of the eighth connection port forming portion 19.

Furthermore, each of the first to eighth connection ports 12a, 13a, 14a, 15a, 16a, 17a, 18a, 19a is connected to, for example, a corresponding heat exchanger or a corresponding pipe which are located at an outside of the flow path switch valve 10 (in other words, an outside of the housing 11) in the heat medium circuit.

For example, the first connection port 12a is connected to a heat exchanger that exchanges heat between the PCU and the heat medium, and the second connection port 13a is connected to a chiller, and each of the third and fifth connection ports 14a, 16a is connected to a radiator. Furthermore, each of the fourth and sixth connection ports 15a, 17a is connected to a heat exchanger that exchanges heat between a battery (serving as an electric power source for running the vehicle) and the heat medium, and the seventh connection port 18a is connected to a first bypass passage, and the eighth connection port 19a is connected to a second bypass passage.

Each of the first connection port 12a and the second connection port 13a functions as an inlet port, into which the heat medium flows from the outside of the flow path switch valve 10 as indicated by arrows A1, A2. In contrast, each of the third to eighth connection ports 14a-19a functions as an outlet port, from which the heat medium is outputted to the outside of the flow path switch valve 10.

In the description of the present embodiment, the first to eighth connection ports 12a, 13a, 14a, 15a, 16a, 17a, 18a, 19a may be referred to as the first to eighth connection ports 12a-19a or the connection ports 12a-19a for short. Furthermore, the first to eighth connection port forming portions 12, 13, 14, 15, 16, 17, 18, 19 may be referred to as the first to eighth connection port forming portions 12-19 or the connection port forming portions 12-19 for short. The second connection port 13a serves as a connection port of the present disclosure, and the second connection port forming portion 13 serves as a connection port forming portion of the present disclosure.

The inside of the housing main body 20 is partitioned into a plurality of spaces 21, 22, 23 through which the heat medium is conducted. Specifically, a first space 21, a second space 22 and a third space 23 are formed at the inside of the housing main body 20, and the third space 23 is placed on the one side relative to the first space 21 and the second space 22 in the valve axial direction Da. Furthermore, the first space 21 is partitioned into first to sixth subspaces 211, 212, 213, 214, 215, 216 (serving as a plurality of subspaces). In the description of the present embodiment, the first to sixth subspaces 211, 212, 213, 214, 215, 216 may be referred to as the first to sixth subspaces 211-216 or the subspaces 211-216 for short.

The housing main body 20 has a primary partition 24 and a plurality of secondary partitions 25. Each of the primary partition 24 and the secondary partitions 25 is formed as a partition shaped in a plate form, a thickness direction of which coincides with a direction perpendicular to the valve axial direction Da. An outer wall of the housing main body 20 can be interpreted as a partition that partitions between: a space at the outside of the housing 11; and the spaces 21, 22, 23 formed at the inside of the housing main body 20.

The primary partition 24 is a partition wall that partitions between the first space 21 and the second space 22. The primary partition 24 is shaped in a cylindrical tubular form or a substantially cylindrical tubular form centered on the operational central axis Cv. Therefore, the operational central axis Cv is located on the radially inner side of the primary partition 24 (i.e., within a radial range Ar of the second space 22 shown in FIG. 1) and extends in the valve axial direction Da. The radial range Ar of the second space 22 is a range that is occupied by the second space 22 in the valve radial direction Dr.

Furthermore, the second space 22 is formed on the radially inner side of the primary partition 24. That is, the primary partition 24 surrounds the second space 22. The first space 21 is located on the radially outer side of the primary partition 24, and the first space 21 surrounds the primary partition 24.

The secondary partitions 25 are partition walls which partition the first space 21 in the valve circumferential direction Dc. That is, the secondary partitions 25 partition the first space 21 into the first to sixth subspaces 211-216.

In detail, the secondary partitions 25 are arranged at intervals in the valve circumferential direction Dc, and each of the first to sixth subspaces 211-216 is formed between corresponding adjacent two of the secondary partitions 25. Furthermore, the secondary partitions 25 are respectively arranged in a radiating form which is radiated about the operational central axis Cv. Therefore, the secondary partitions 25 and the subspaces 211-216 are alternately arranged in the valve circumferential direction Dc.

Furthermore, the first to sixth subspaces 211-216 are arranged adjacent to the second space 22, and the primary partition 24 is interposed between: the first to sixth subspaces 211-216; and the second space 22. That is, the primary partition 24 faces the second space 22 on the radially inner side of the primary partition 24 and faces the first to sixth subspaces 211-216 on the radially outer side of the primary partition 24. The arrangement of the first to sixth subspaces 211-216 discussed above can be rephrased in that the first to sixth subspaces 211-216 are located on the radially outer side of the primary partition 24 and are arranged in the valve circumferential direction Dc.

The first to sixth subspaces 211-216, the second space 22 and the third space 23 are respectively connected to the outside of the housing 11 and respectively function as a portion of the flow path that conducts the heat medium. Specifically, the third space 23 is communicated with the first connection port 12a and is connected to the outside of the housing 11 through the first connection port 12a. The second space 22 is communicated with the second connection port 13a and is connected to the outside of the housing 11 through the second connection port 13a.

The first subspace 211 is communicated with the third connection port 14a and is connected to the outside of the housing 11 through the third connection port 14a. The second subspace 212 is communicated with the fourth connection port 15a and is connected to the outside of the housing 11 through the fourth connection port 15a. The third subspace 213 is communicated with the fifth connection port 16a and is connected to the outside of the housing 11 through the fifth connection port 16a.

The fourth subspace 214 is communicated with the sixth connection port 17a and is connected to the outside of the housing 11 through the sixth connection port 17a. The fifth subspace 215 is communicated with the seventh connection port 18a and is connected to the outside of the housing 11 through the seventh connection port 18a. The sixth subspace 216 is communicated with the eighth connection port 19a and is connected to the outside of the housing 11 through the eighth connection port 19a.

Figure 4:
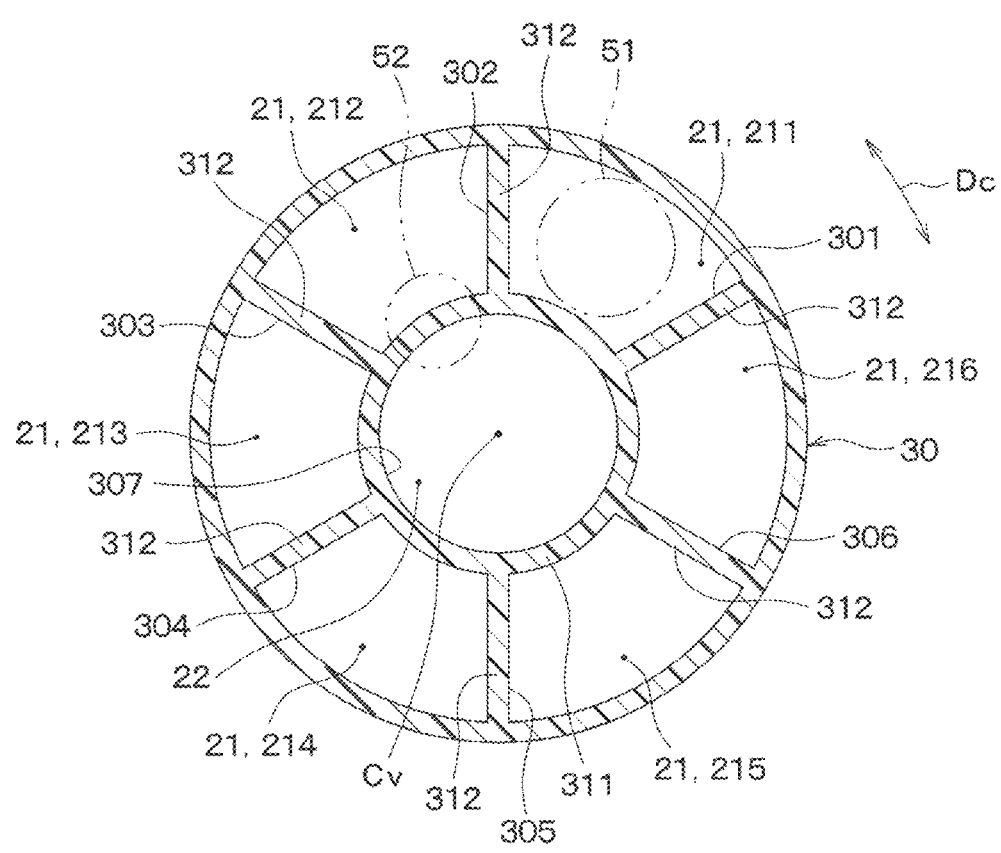
FIG. 4 is a cross-sectional view taken along line IV-IV in FIG. 1, showing a stator alone according to the first embodiment.

As shown in FIGS. 1 and 4, the stator 30 is shaped in a plate form that has a thickness direction which coincides with the valve axial direction Da, and the stator 30 is made of, for example, resin that has a high sliding performance. In the present embodiment, the stator 30 is generally shaped in a circular plate form. The stator 30 is installed at the inside of the housing main body 20 such that rotation of the stator 30 relative to the housing main body 20 is limited through engagement between a recess and projection (not shown).

In the housing main body 20, the stator 30 is placed between: the first space 21 and the second space 22; and third space 23. Therefore, the third space 23 is placed on the one side relative to the stator 30 in the valve axial direction Da, and the first space 21 and the second space 22 are placed on the other side relative to the stator 30 in the valve axial direction Da.

Furthermore, the stator 30 is placed on the one side relative to the primary partition 24 and the secondary partitions 25 in the valve axial direction Da. From the one side in the valve axial direction Da, the stator 30 contacts: one end 241 of the primary partition 24, which faces the one side in the valve axial direction Da; and one end of each secondary partition 25, which faces the one side in the valve axial direction Da.

The stator 30 has a plurality of flow holes, specifically, first to seventh flow holes 301, 302, 303, 304, 305, 306, 307 through which the heat medium is conducted. Each of the first to seventh flow holes 301, 302, 303, 304, 305, 306, 307 is formed as a through-hole that extends through the stator 30 in the valve axial direction Da. In the description of the present embodiment, the first to seventh flow holes 301, 302, 303, 304, 305, 306, 307 may be referred to as the first to seventh flow holes 301-307 or the flow holes 301-307 for short.

Specifically, the first flow hole 301 of the stator 30 corresponds to the first subspace 211, and a cross-section of the first flow hole 301, which is perpendicular to the valve axial direction Da, has a shape that is the same or substantially the same as a shape of a cross-section of the first subspace 211, which is perpendicular to the valve axial direction Da. An end of the first flow hole 301, which faces the other side in the valve axial direction Da, is communicated only with the first subspace 211 among the first to sixth subspaces 211-216 and the second space 22. For example, the first subspace 211 is arranged such that an entirety or substantially entirety of an end of the first subspace 211, which faces the one side in the valve axial direction Da, overlaps with the end of the first flow hole 301, which faces the other side in the valve axial direction Da.

Furthermore, the second flow hole 302 corresponds to the second subspace 212, and a cross-section of the second flow hole 302, which is perpendicular to the valve axial direction Da, has a shape that is the same or substantially the same as a shape of a cross-section of the second subspace 212, which is perpendicular to the valve axial direction Da. An end of the second flow hole 302, which faces the other side in the valve axial direction Da, is communicated only with the second subspace 212 among the first to sixth subspaces 211-216 and the second space 22. For example, the second subspace 212 is arranged such that an entirety or substantially entirety of an end of the second subspace 212, which faces the one side in the valve axial direction Da, overlaps with the end of the second flow hole 302, which faces the other side in the valve axial direction Da.

Furthermore, the third flow hole 303 corresponds to the third subspace 213, and a cross-section of the third flow hole 303, which is perpendicular to the valve axial direction Da, has a shape that is the same or substantially the same as a shape of a cross-section of the third subspace 213, which is perpendicular to the valve axial direction Da. An end of the third flow hole 303, which faces the other side in the valve axial direction Da, is communicated only with the third subspace 213 among the first to sixth subspaces 211-216 and the second space 22. For example, the third subspace 213 is arranged such that an entirety or substantially entirety of an end of the third subspace 213, which faces the one side in the valve axial direction Da, overlaps with the end of the third flow hole 303, which faces the other side in the valve axial direction Da.

Furthermore, the fourth flow hole 304 corresponds to the fourth subspace 214, and a cross-section of the fourth flow hole 304, which is perpendicular to the valve axial direction Da, has a shape that is the same or substantially the same as a shape of a cross-section of the fourth subspace 214, which is perpendicular to the valve axial direction Da. An end of the fourth flow hole 304, which faces the other side in the valve axial direction Da, is communicated only with the fourth subspace 214 among the first to sixth subspaces 211-216 and the second space 22. For example, the fourth subspace 214 is arranged such that an entirety or substantially entirety of an end of the fourth subspace 214, which faces the one side in the valve axial direction Da, overlaps with the end of the fourth flow hole 304, which faces the other side in the valve axial direction Da.

Furthermore, the fifth flow hole 305 corresponds to the fifth subspace 215, and a cross-section of the fifth flow hole 305, which is perpendicular to the valve axial direction Da, has a shape that is the same or substantially the same as a shape of a cross-section of the fifth subspace 215, which is perpendicular to the valve axial direction Da. An end of the fifth flow hole 305, which faces the other side in the valve axial direction Da, is communicated only with the fifth subspace 215 among the first to sixth subspaces 211-216 and the second space 22. For example, the fifth subspace 215 is arranged such that an entirety or substantially entirety of an end of the fifth subspace 215, which faces the one side in the valve axial direction Da, overlaps with the end of the fifth flow hole 305, which faces the other side in the valve axial direction Da.

Furthermore, the sixth flow hole 306 corresponds to the sixth subspace 216, and a cross-section of the sixth flow hole 306, which is perpendicular to the valve axial direction Da, has a shape that is the same or substantially the same as a shape of a cross-section of the sixth subspace 216, which is perpendicular to the valve axial direction Da. An end of the sixth flow hole 306, which faces the other side in the valve axial direction Da, is communicated only with the sixth subspace 216 among the first to sixth subspaces 211-216 and the second space 22. For example, the sixth subspace 216 is arranged such that an entirety or substantially entirety of an end of the sixth subspace 216, which faces the one side in the valve axial direction Da, overlaps with the end of the sixth flow hole 306, which faces the other side in the valve axial direction Da.

Furthermore, the seventh flow hole 307 corresponds to the second space 22, and a cross-section of the seventh flow hole 307, which is perpendicular to the valve axial direction Da, has a shape that is the same or substantially the same as a shape of a periphery of the second space 22. That is, the cross-section of the seventh flow hole 307, which is perpendicular to the valve axial direction Da, has a circular shape or a substantially circular shape. An end of the seventh flow hole 307, which faces the other side in the valve axial direction Da, is communicated only with the second space 22 among the first to sixth subspaces 211-216 and the second space 22. For example, the second space 22 is arranged such that an entirety or substantially entirety of an end of the second space 22, which faces the one side in the valve axial direction Da, overlaps with the end of the seventh flow hole 307, which faces the other side in the valve axial direction Da.

Due to the above-described arrangements, as shown in FIGS. 2 and 4, in a view taken in the valve axial direction Da, the arrangement of the first to seventh flow holes 301-307 of the stator 30 is similar to the arrangement of the first to sixth subspaces 211-216 and the second space 22. That is, in the view taken in the valve axial direction Da, the seventh flow hole 307 has the circular shape or the substantially circular shape centered on the operational central axis Cv, and the first to sixth flow holes 301-306 are placed on the radially outer side of the seventh flow hole 307. The first to sixth flow holes 301-306 are arranged in the valve circumferential direction Dc and surround the seventh flow hole 307.

Furthermore, as shown in FIG. 4, the first to seventh flow holes 301-307 are formed independently without being communicated with each other in the stator 30. In order to implement the above-described configuration, the stator 30 has a plurality of stator partitions 311, 312 (specifically, a primary stator partition 311 and a plurality of secondary stator partitions 312) each of which partitions between corresponding two or more of the first to seventh flow holes 301-307.

Specifically, the primary stator partition 311 has a circular ring form or a substantially circular ring form, and the secondary stator partitions 312 are placed on the radially outer side of the primary stator partition 311 and are respectively arranged in a radiating form which is radiated about the operational central axis Cv.

Each of the secondary stator partitions 312 partitions between corresponding two of the first to sixth flow holes 301-306. That is, the secondary stator partitions 312 and the first to sixth flow holes 301-306 are alternately arranged in the valve circumferential direction Dc. Furthermore, the primary stator partition 311 partitions between: the first to sixth flow holes 301-306; and the seventh flow hole 307.

As shown in FIGS. 1 and 2, the rotor 50 is a valve element that changes the flow path of the heat medium in the housing 11 in response to the rotation of the rotor 50. Furthermore, the rotor 50 is configured to rotate about the operational central axis Cv. That is, the rotor 50 is configured to rotate about the operational central axis Cv relative to the housing 11 and the stator 30.

The rotor 50 is shaped in a circular plate form that has a thickness direction which coincides with the valve axial direction Da, and the rotor 50 is made of, for example, resin that has a high sliding performance. The rotor 50 is placed on the one side relative to the stator 30 in the valve axial direction Da, and the rotor 50 is stacked over and is in contact with the stator 30. That is, the rotor 50 is configured to rotate relative to the housing 11 and the stator 30 while sliding relative to the stator 30.

In other words, in the housing main body 20, the rotor 50 is placed between: the first space 21 and the second space 22; and the third space 23. Furthermore, in the housing main body 20, the rotor 50 is placed to partition between: the first space 21 and the second space 22; and the third space 23. An outer diameter of the rotor 50 is set such that the rotor 50 covers all of the first to seventh flow holes 301-307 of the stator 30.

Furthermore, the rotor 50 is urged toward the other side in the valve axial direction Da by: a pressure of the heat medium conducted in the housing main body 20; and an urging force of a spring (not shown). Therefore, leakage of the heat medium between the rotor 50 and the stator 30 is limited, and leakage of the heat medium at a contact location between each partition 24, 25 of the housing main body 20 and the stator 30 is limited.

In order to change the flow path of the heat medium in the housing 11, the rotor 50 has a first communication passage 51 and a second communication passage 52 through which the heat medium flows. Regardless of the rotational position of the rotor 50, the rotor 50 blocks the communication between the second space 22 and the third space 23. Furthermore, although the rotor 50 is not shown in FIGS. 2 and 4, the first communication passage 51 and the second communication passage 52 are respectively indicated by a dot-dot-dash line (i.e., an imaginary line) in FIGS. 2 and 4.

The first communication passage 51 is a through-hole that extends through the rotor 50 in the valve axial direction Da. The first communication passage 51 is arranged such that regardless of the rotational position of the rotor 50, the first communication passage 51 is placed on the one side relative to the first space 21 in the valve axial direction Da and overlaps with the first space 21 in the valve axial direction Da, and the first communication passage 51 is placed on the other side relative to the third space 23 in the valve axial direction Da and overlaps with the third space 23 in the valve axial direction Da. In other words, regardless of the rotational position of the rotor 50, the first communication passage 51 overlaps with both the first space 21 and the third space 23 in the view taken in the valve axial direction Da. Therefore, in response to the rotation of the rotor 50, the rotor 50 communicates a corresponding one of the first to sixth subspaces 211-216, which overlaps with the first communication passage 51 in the view taken in the valve axial direction Da, to the third space 23.

The second communication passage 52 is in a form of a recess that is recessed on the rotor 50 from the other side toward the one side in the valve axial direction Da. That is, in the rotor 50, although an end of the second communication passage 52, which faces the other side in the valve axial direction Da, is opened, another end of the second communication passage 52, which faces the one side in the valve axial direction Da, is closed. Furthermore, the second communication passage 52 extends from the inner side of the primary partition 24 to the outer side of the primary partition 24 in the valve radial direction Dr.

Therefore, regardless of the rotational position of the rotor 50, the second communication passage 52 is placed on the one side relative to the first space 21 and the second space 22 in the valve axial direction Da and overlaps with both the first space 21 and the second space 22 in the valve axial direction Da. In other words, regardless of the rotational position of the rotor 50, the second communication passage 52 overlaps with both the first space 21 and the second space 22 in the view taken in the valve axial direction Da. With this configuration, in response to the rotation of the rotor 50, the rotor 50 communicates a corresponding one of the first to sixth subspaces 211-216, which overlaps with the second communication passage 52 in the view taken in the valve axial direction Da, to the second space 22.

Furthermore, in the view taken in the valve axial direction Da, the rotor 50 blocks a flow of the heat medium in remaining subspaces, which are not communicated with any one of the first and second communication passages 51, 52, among the first to sixth subspaces 211-216. In short, the rotor 50 fully closes the corresponding connection ports that are communicated with the remaining subspaces which are not communicated with any one of the first and second communication passages 51, 52.

Because of the above-described configuration, in response to the movement of the rotor 50 relative to the housing 11, the rotor 50 changes the subspace to be communicated with the third space 23 through the first communication passage 51 among the first to sixth subspaces 211-216. At the same time, the rotor 50 changes the subspace to be communicated with the second space 22 through the second communication passage 52 among the first to sixth subspaces 211-216. The above expression "the movement of the rotor 50 relative to the housing 11" means, in detail, the rotation of the rotor 50 relative to the housing 11 about the operational central axis Cv.

Furthermore, a location of the first communication passage 51 and a location of the second communication passage 52 in the valve circumferential direction Dc are displaced from each other. Therefore, among the first to sixth subspaces 211-216, the subspace, which is communicated with the third space 23 through the first communication passage 51, is different from the subspace, which is communicated with the second space 22 through the second communication passage 52.

For example, at the locations of the first and second communication passages 51, 52 shown in FIG. 2, although the first subspace 211 is communicated with the third space 23 through the first communication passage 51, the first subspace 211 is not communicated with the second space 22.

In contrast, although the second subspace 212 is communicated with the second space 22 through the second communication passage 52, the second subspace 212 is not communicated with the third space 23.

As shown in FIG. 1, the shaft 60 is a rotatable shaft member that transmits a rotational force of the actuator 40 to the rotor 50. The shaft 60 couples between the actuator 40 and the rotor 50 through the third space 23 in a manner that enables transmission of the drive force between the actuator 40 and the rotor 50. Specifically, the shaft 60 extends from the rotor 50 toward the one side in the valve axial direction Da and is supported in a manner that enables the rotation of the shaft 60 about the operational central axis Cv relative to the housing 11. That is, the shaft 60 is configured to rotate about the operational central axis Cv relative to the housing 11 and the stator 30. For example, the shaft 60 is a rod material, which is shaped in a substantially cylindrical form and extends in the valve axial direction Da, and the shaft 60 is cantilevered and supported on the actuator 40 side in a manner that enables the rotation of the shaft 60.

Furthermore, the shaft 60 is coupled to the rotor 50 in a manner that limits relative rotation of the shaft 60 relative to the rotor 50. Therefore, the shaft 60 is rotated integrally with the rotor 50 about the operational central axis Cv. In short, the shaft 60 and the rotor 50 are configured to integrally rotate about the operational central axis Cv relative to the housing 11 and the stator 30. The shaft 60 and the rotor 50 form a rotatable unit 62 that is rotated about the operational central axis Cv relative to the housing 11.

The actuator 40 is a drive power source that is configured to rotate the rotor 50, and the actuator 40 includes: an electric motor; and a speed reducer mechanism that reduces a rotational speed of rotation outputted from the electric motor. At the actuator 40, a rotational angle of the electric motor is controlled by a control device (not shown). Therefore, the rotational position of the rotor 50 about the operational central axis Cv is controlled by this control device.

Although there is no particular limitation on the location of the actuator 40, the actuator 40 is placed on the one side relative to the third space 23 in the valve axial direction Da in the present embodiment.

In the flow path switch valve 10 configured as described above, with reference to FIG. 1, when the actuator 40 is energized, the actuator 40 rotates the rotor 50 and the shaft 60 around the operational central axis Cv. The actuator 40 stops the rotation of the rotor 50 and the shaft 60 so that the rotational position of the rotor 50 coincides with a predetermined target position based on a control signal outputted from the control device, and the actuator 40 maintains the rotational position of the rotor 50 at that predetermined target position.

For example, it is now assumed that as a result of the rotation of the rotor 50 caused by the actuator 40, the rotor 50 is placed in a rotational position in which the first and second communication passages 51, 52 are respectively placed in the positions shown in FIG. 2. In this case, as shown in FIGS. 1 and 2, in the housing 11, although the first subspace 211 is communicated with the third space 23 through the first communication passage 51 of the rotor 50, the first subspace 211 is not communicated with the second space 22. In contrast, although the second subspace 212 is communicated with the second space 22 through the second communication passage 52 of the rotor 50, the second subspace 212 is not communicated with the third space 23. Furthermore, the flow of the heat medium in each of the third to sixth subspaces 213-216 is blocked by the rotor 50. That is, the fifth to eighth connection ports 16a-19a are fully closed.

As a result, the flow of the heat medium is enabled between the first connection port 12a and the third connection port 14a, and thereby the heat medium flows from the first connection port 12a to the third connection port 14a. At this time, this heat medium flows from the first connection port 12a to the third connection port 14a through the third space 23, the first communication passage 51 of the rotor 50, the first flow hole 301 of the stator 30 and the first subspace 211 in this order.

Furthermore, at the same time, the flow of the heat medium is enabled between the second connection port 13a and the fourth connection port 15a, and thereby the heat medium flows from the second connection port 13a to the fourth connection port 15a. At this time, this heat medium flows from the second connection port 13a to the fourth connection port 15a through the second space 22, the seventh flow hole 307 of the stator 30, the second communication passage 52 of the rotor 50 and the second subspace 212 in this order.

As described above, according to the present embodiment, as shown in FIGS. 1 and 2, the rotor 50 has the first communication passage 51 and the second communication passage 52. The first communication passage 51 is formed as the through-hole that extends through the rotor 50 in the valve axial direction Da, and the first communication passage 51 is placed on the one side relative to the first space 21 in the valve axial direction Da and overlaps with the first space 21 in the valve axial direction Da. The second communication passage 52 is in the form of the recess that is recessed on the rotor 50 from the other side toward the one side, and the second communication passage 52 is placed on the one side relative to the first space 21 and the second space 22 in the valve axial direction Da and overlaps with both the first space 21 and the second space 22 in the valve axial direction Da. Furthermore, in response to the movement of the rotor 50 relative to the housing 11, the rotor 50 changes the subspace to be communicated with the third space 23 through the first communication passage 51 among the first to sixth subspaces 211-216. At the same time, the rotor 50 changes the subspace to be communicated with the second space 22 through the second communication passage 52 among the first to sixth subspaces 211-216.

Thus, it is possible to simultaneously change the flow path, which passes through the first communication passage 51 of the rotor 50, and the flow path, which passes through the second communication passage 52, by moving the rotor 50 without complicating the structure of the rotor 50. Therefore, the multiple flow paths can be changed among the plurality of flow paths with the simple structure in the flow path switch valve 10 of the present embodiment.

(1) Furthermore, according to the present embodiment, the rotor 50 is configured to be rotated about the operational central axis Cv which is located on the radially inner side of the primary partition 24 and extends in the valve axial direction Da. Thus, the plurality of flow paths can be changed by rotating the rotor 50. Furthermore, by restraining the rotor 50 in the housing main body 20 in a manner that limits the positional deviation of the rotor 50 in the valve radial direction Dr while allowing the rotation of the rotor 50, the end portion of the shaft 60, which is located on the rotor 50 side, can be rotatably supported.

Second Embodiment

Next, a second embodiment will be described. In the present embodiment, points, which are different from the first embodiment, will be mainly described. Furthermore, the description of the same or equivalent portions as those in the aforementioned embodiment will be omitted or simplified. This is also true in the description of the later embodiments.

Figure 5:
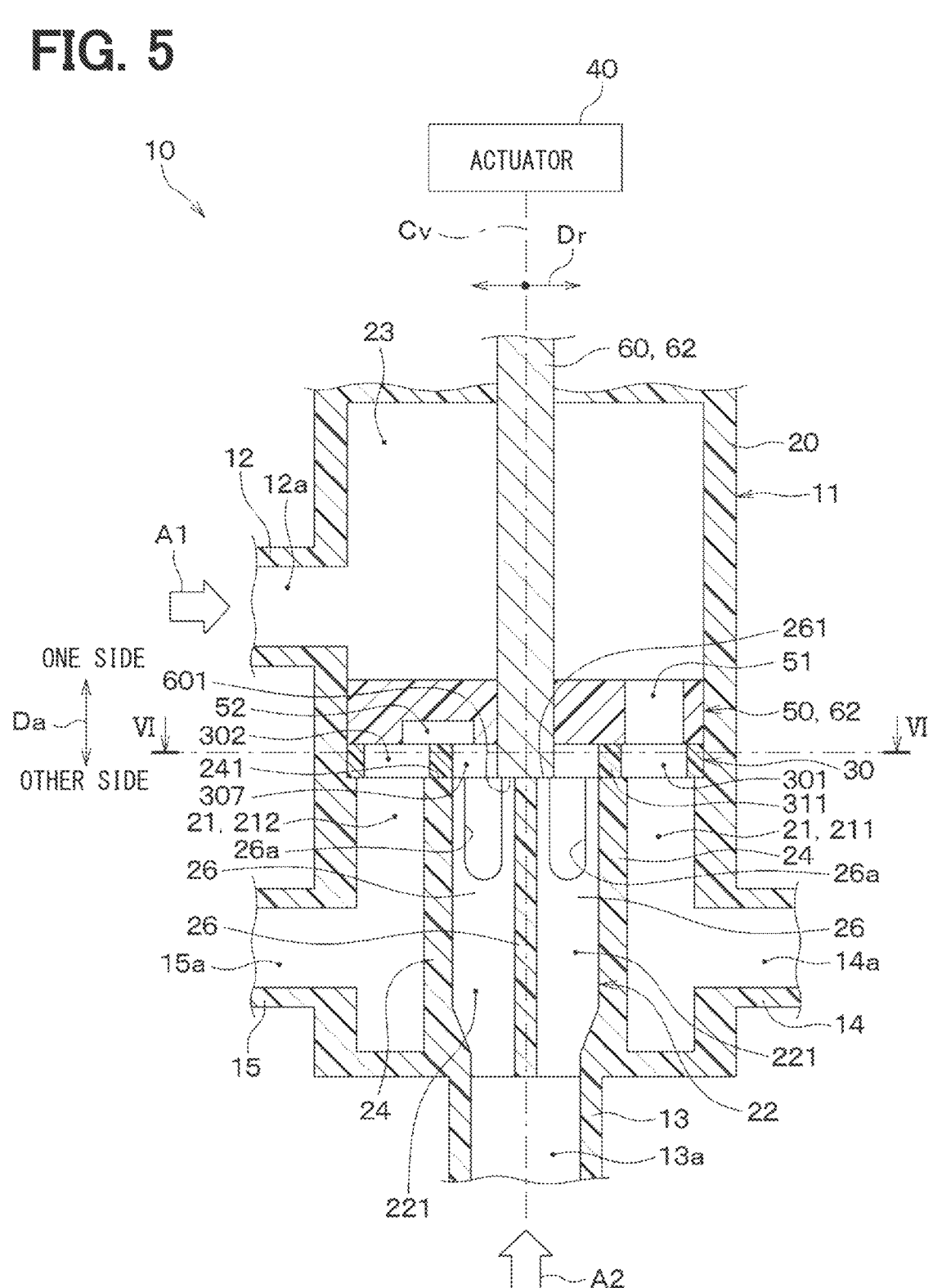
FIG. 5 is a longitudinal cross-sectional view corresponding to FIG. 1, schematically showing a structure of a flow path switch valve according to a second embodiment.
Figure 6:
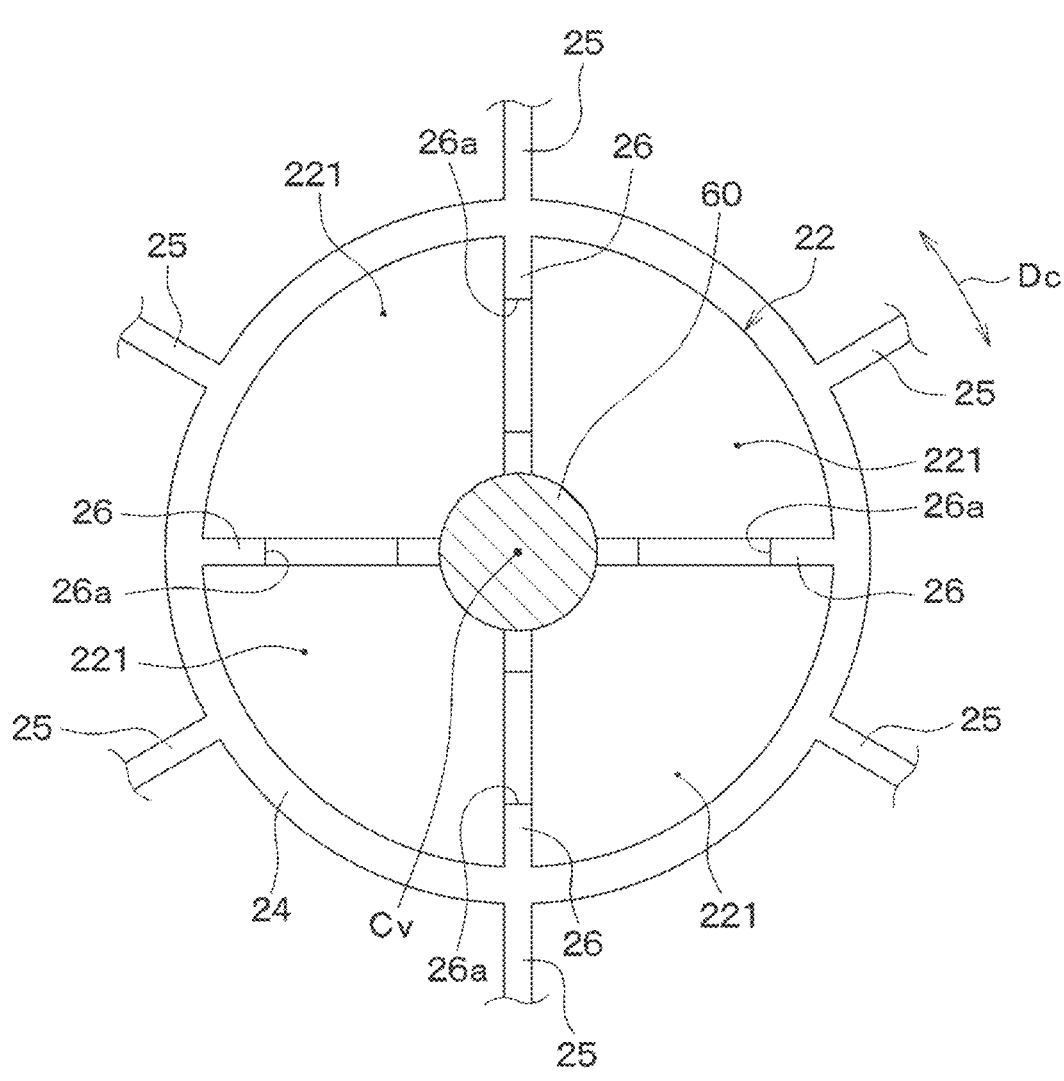
FIG. 6 is a cross-sectional view taken along line VI-VI in FIG. 5 while eliminating a stator shown in FIG. 5.
Figure 7:
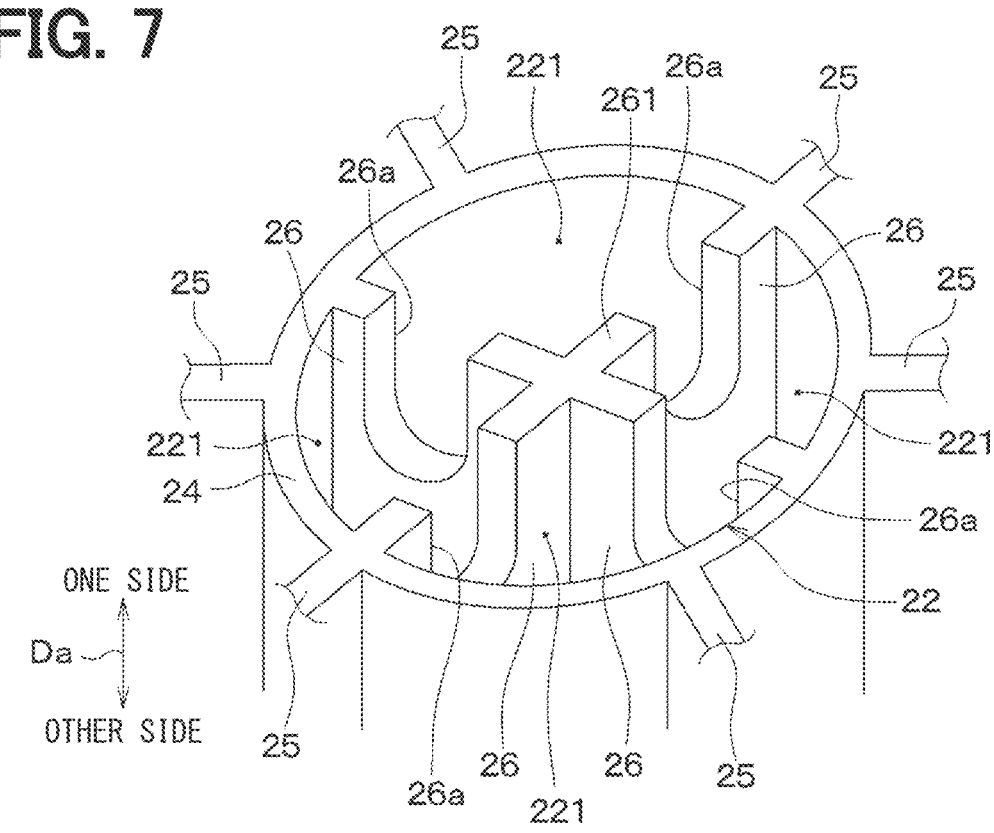
FIG. 7 is a perspective view schematically showing a second space and its periphery of a housing according to the second embodiment.

As shown in FIGS. 5 to 7, in the present embodiment, the housing main body 20 has a plurality of spatial inner walls 26. The spatial inner walls 26 are placed at the inside of the second space 22 and are respectively arranged in a radiating form which is radiated about the operational central axis Cv in the view taken in the valve axial direction Da. Specifically, radially inner ends of the spatial inner walls 26, which face the inner side in the valve radial direction Dr, are joined together, and radially outer ends of the spatial inner walls 26, which face the outer side in the valve radial direction Dr, are joined to an inner peripheral surface of the primary partition 24.

Therefore, the spatial inner walls 26 partition the second space 22 into a plurality of compartment spaces 221. For example, in the present embodiment, the number of the spatial inner walls 26 is four, and the number of the compartment spaces 221 is four. In FIG. 6, illustration of the stator 30 is omitted to illustrate the primary and secondary partitions 24, 25 of the housing main body 20.

Furthermore, each of the spatial inner walls 26 has one wall end 261 which faces the one side in the valve axial direction Da. Furthermore, all of the spatial inner walls 26 are formed such that a position of the one wall end 261 of the respective spatial inner walls 26 in the valve axial direction Da is identical to each other.

The shaft 60 of the present embodiment is coupled to the rotor 50 in a manner that limits the relative rotation of the shaft 60 relative to the rotor 50 like in the first embodiment. However, unlike the first embodiment, the shaft 60 of the present embodiment extends through the rotor 50. The shaft 60 has an end (hereinafter referred to as the other end) 601, which faces the other side in the valve axial direction Da, and the other end 601 of the shaft 60 is placed in the seventh flow hole 307 of the stator 30.

The other end 601 of the shaft 60 is opposed to and contacts the one wall ends 261 of the spatial inner walls 26 in the valve axial direction Da. In other words, the other end 601 of the shaft 60 abuts against the one wall ends 261 in the valve axial direction Da. In short, the one wall ends 261 of the spatial inner walls 26 are in contact with the other end 601 of the shaft 60, which is the part of the rotatable unit 62.

Thereby, the one wall ends 261 of the spatial inner walls 26 receive the shaft 60 from the other side of the shaft 60 in the valve axial direction Da. The expression "the one wall ends 261 of the spatial inner walls 26 receive the shaft 60" means that the one wall ends 261 support the shaft 60 to limit movement of the shaft 60 from the contact position of the shaft 60, in which the other end 601 of the shaft 60 contacts the one wall ends 261, toward the other side in the valve axial direction Da.

Furthermore, each spatial inner wall 26 has a communication groove 26a that is cut from an end of the spatial inner wall 26, which faces the one side in the valve axial direction Da, toward the other side in the valve axial direction Da. The communication grooves 26a are all located at the inside of the second space 22, and thereby a flow path, which conducts the heat medium from the second connection port 13a to the second communication passage 52 of the rotor 50, is formed at the inside of the housing main body 20.

Each adjacent two of the compartment spaces 221 communicate with each other through the communication groove 26a of the corresponding spatial inner wall 26 which is interposed between the adjacent two of the compartment spaces 221. That is, in the present embodiment, the communication grooves 26a of the spatial inner walls 26 are formed as a merging passage that communicates the compartment spaces 221 with each other.

Figure 8:
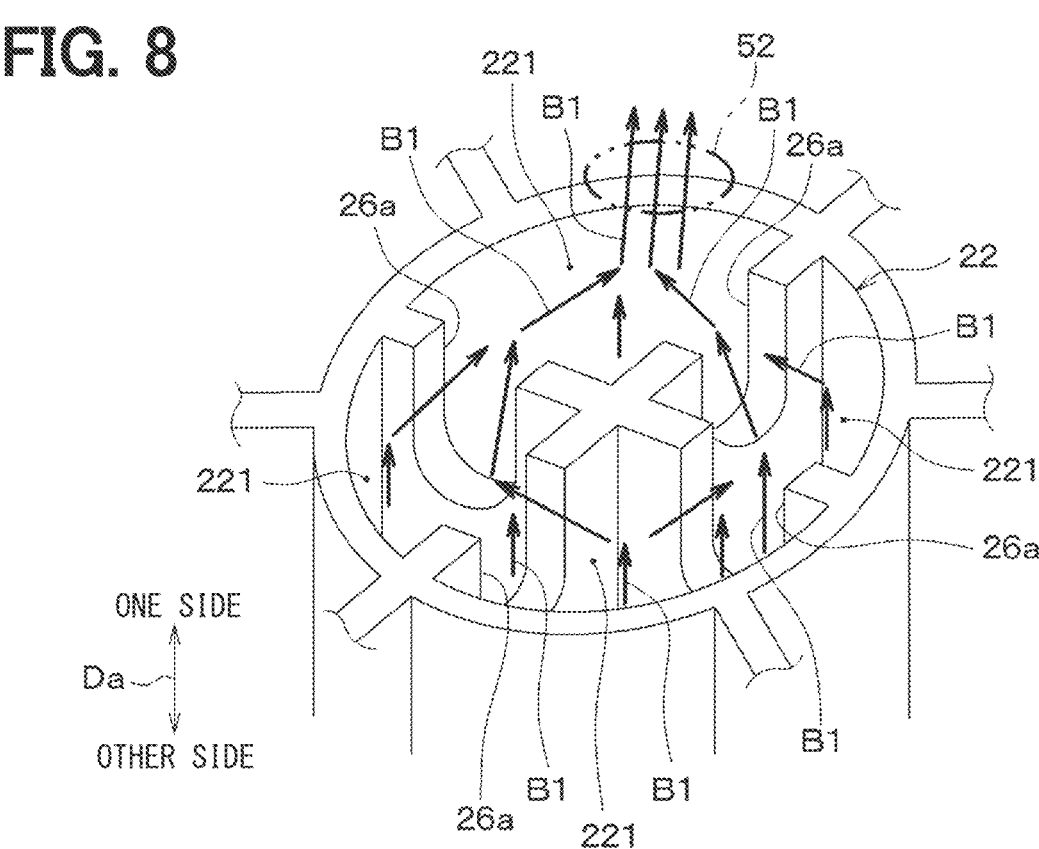
FIG. 8 is a perspective view indicating flows of a heat medium in the second space by adding arrows to the drawing of FIG. 7 according to the second embodiment.

For example, the heat medium, which flows from the second connection port 13a toward the second communication passage 52 of the rotor 50 through the second space 22, flows as indicated by arrows B1 in FIG. 8. That is, in the flow path which extends from the second connection port 13a to the second communication passage 52 of the rotor 50, the heat medium is conducted through the second connection port 13a and is divided into a plurality of flows, which respectively flow in the plurality of compartment spaces 221, and the plurality of communication grooves 26a are configured to merge the plurality of flows of the heat medium, which respectively flow in the plurality of compartment spaces 221, together on the upstream side of the second communication passage 52 in the flow direction of the heat medium. In FIG. 8, the second communication passage 52 of the rotor 50 is simplified and is indicated by a dot-dot-dash line.

In the present embodiment, as shown in FIG. 5, like the communication grooves 26a, the seventh flow hole 307 of the stator 30 is also configured to merge the plurality of flows of the heat medium, which respectively flow in the plurality of compartment spaces 221 after flowing from the second connection port 13a, together on the upstream side of the second communication passage 52 in the flow direction of the heat medium. Therefore, the seventh flow hole 307 of the stator 30 is also provided as a part of the merging passage.

(1) As described above, according to the present embodiment, the one wall ends 261 of the spatial inner walls 26 contact the other end 601 of the shaft 60, which is the part of the rotatable unit 62 and thereby receive the shaft 60 from the other side relative to the shaft 60 in the valve axial direction Da. Thereby, the rotation of the rotor 50 and the shaft 60 can be more stabilized compared to the cantilevered support where the other end 601 of the shaft 60 is not supported. Furthermore, since the shaft 60 is easily maintained in an upright position along the valve axial direction Da, for example, a seal, such as an O-ring, for the shaft 60 is stabilized, thereby limiting leakage of the heat medium around the shaft 60.

(2) Furthermore, according to the present embodiment, in the flow path which extends from the second connection port 13a to the second communication passage 52 of the rotor 50, the heat medium is conducted through the second connection port 13a and is divided into the plurality of flows, which respectively flow in the plurality of compartment spaces 221, and the plurality of communication grooves 26a are configured to merge the plurality of flows of the heat medium, which respectively flow in the plurality of compartment spaces 221, together on the upstream side of the second communication passage 52 in the flow direction of the heat medium.

Therefore, the plurality of flows of the heat medium supplied into and flowing in the plurality of compartment spaces 221 after flowing from the second connection port 13a can reach the second communication passage 52 without being blocked. Thus, compared to a case where one or more of the plurality of flows of the heat medium supplied into and flowing in the plurality of compartment spaces 221 are blocked, it is possible to limit the flow loss of the heat medium.

The rest of the present embodiment, which is other than the above-described points, is the same as that of the first embodiment. Furthermore, in the present embodiment, the advantages, which are achieved by the common configuration that is common to the first embodiment described above, can be obtained in the same manner as in the first embodiment.

Third Embodiment

Next, a third embodiment will be described. In the present embodiment, points, which are different from the second embodiment described above, will be mainly described.

Figure 9:
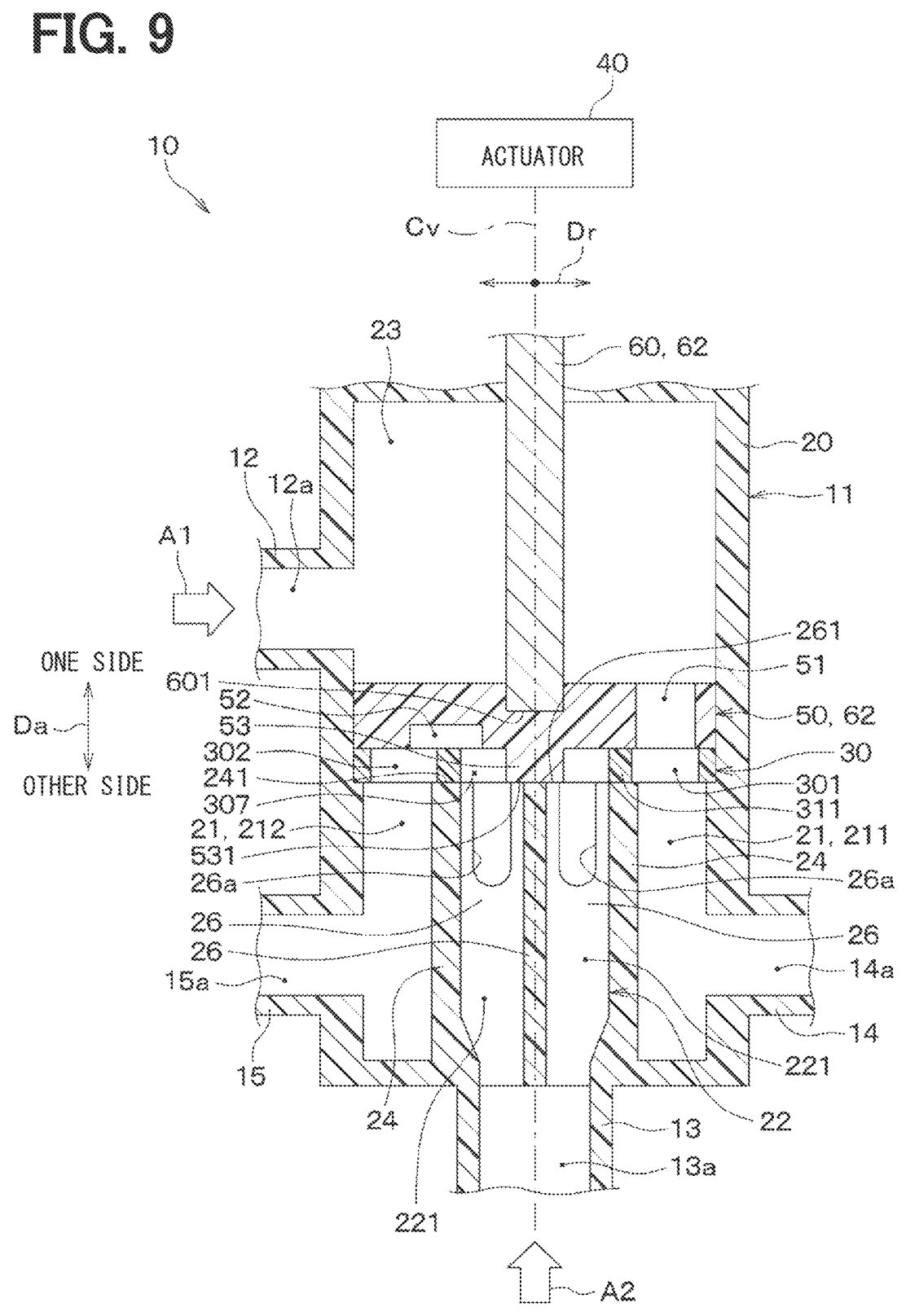

As shown in FIG. 9, in the present embodiment, the shaft 60 is coupled to the rotor 50 in a manner that limits the relative rotation of the shaft 60 relative to the rotor 50 like in the second embodiment. However, unlike the second embodiment, the shaft 60 of the present embodiment does not extend through the rotor 50. For example, the other end 601 of the shaft 60 abuts against the rotor 50 from the one side in the valve axial direction Da.

Furthermore, in the present embodiment, the rotor 50 has a projection 53 that projects from the rotor 50 toward the other side in the valve axial direction Da. The projection 53 projects toward the other side in the valve axial direction Da relative to a surrounding portion of the rotor 50, which surrounds the projection 53, and the projection 53 is received in the seventh flow hole 307 of the stator 30. The projection 53 has an end (hereinafter referred to as the other end) 531 which faces the other side in the valve axial direction Da.

The other end 531 of the projection 53 of the present embodiment is opposed to and contacts the one wall ends 261 of the spatial inner walls 26 in the valve axial direction Da like the other end 601 of the shaft 60 of the second embodiment. In short, the one wall ends 261 of the spatial inner walls 26 are in contact with the other end 531 of the projection 53 which is the part of the rotatable unit 62.

Thus, although the rotor 50 is interposed between the one wall ends 261 of the spatial inner walls 26 and the shaft 60, the one wall ends 261 of the spatial inner walls 26 of the present embodiment receive the shaft 60 from the other side in the valve axial direction Da like in the second embodiment.

The rest of the present embodiment, which is other than the above-described points, is the same as that of the second embodiment. Furthermore, according to the present embodiment, the advantages, which are achieved by the common configuration that is common to the second embodiment described above, can be obtained in the same manner as in the second embodiment.

Fourth Embodiment

Next, a fourth embodiment will be described. In the present embodiment, points, which are different from the second embodiment described above, will be mainly described.

Figure 10:
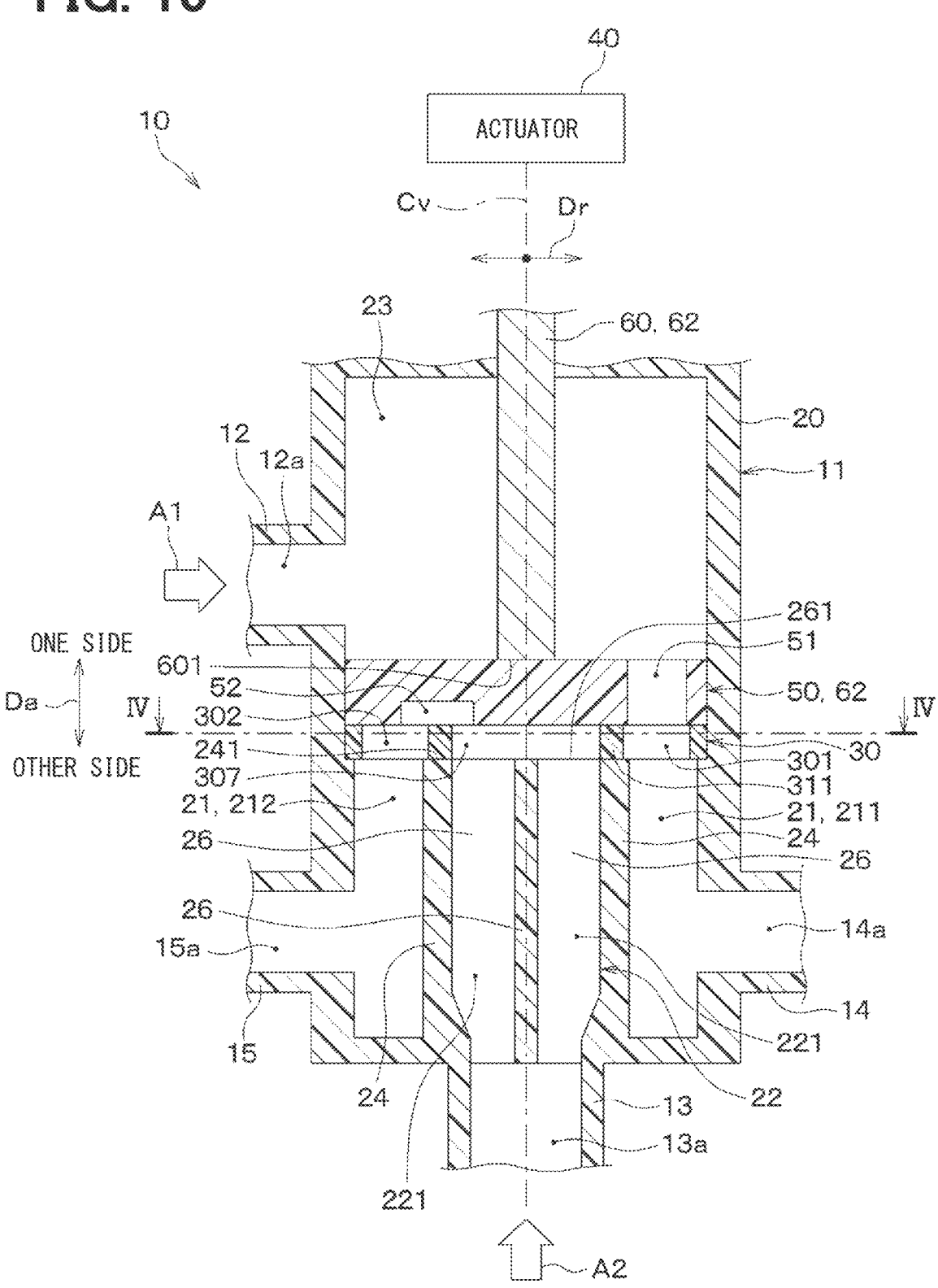
FIG. 10 is a longitudinal cross-sectional view corresponding to FIG. 1, schematically showing a structure of a flow path switch valve according to a fourth embodiment.

As shown in FIG. 10, in the present embodiment, the shaft 60 is coupled to the rotor 50 in a manner that limits the relative rotation of the shaft 60 relative to the rotor 50 like in the second embodiment. However, unlike the second embodiment, the shaft 60 of the present embodiment does not extend through the rotor 50. For example, the other end

601 of the shaft 60 abuts against the rotor 50 from the one side in the valve axial direction Da. A cross-section of the stator 30, which is taken along line IV-IV in FIG. 10, is the same as the cross-section of the stator 30 indicated in FIG. 4.

Figure 11:
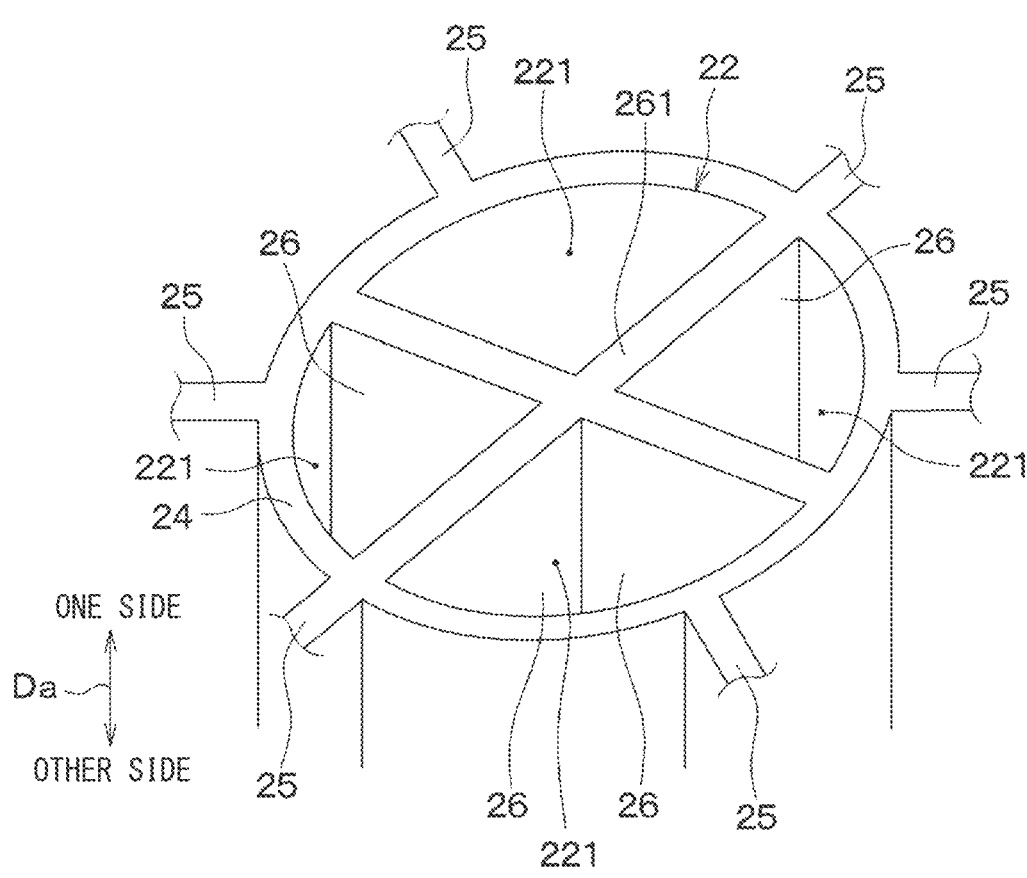
FIG. 11 is a perspective view corresponding to FIG. 7, schematically showing a second space and its periphery of a housing according to the fourth embodiment.

Furthermore, as shown in FIGS. 10 and 11, the communication groove 26a (see FIGS. 5 and 7) is not formed at any one of the spatial inner walls 26 placed in the second space 22. Therefore, the compartment spaces 221, which are partitioned by the spatial inner walls 26, are not communicated with each other in the second space 22.

However, the compartment spaces 221 are communicated with the seventh flow hole 307 of the stator 30 on the one side of the compartment spaces 221 in the valve axial direction Da like in the second embodiment. That is, in the present embodiment, the seventh flow hole 307 is formed as the merging passage that communicates the compartment spaces 221 with each other.

Therefore, in the flow path which extends from the second connection port 13a to the second communication passage 52 of the rotor 50, the heat medium is conducted through the second connection port 13a and is divided into the plurality of flows, which respectively flow in the plurality of compartment spaces 221, and the seventh flow hole 307 is configured to merge the plurality of flows of the heat medium, which respectively flow in the plurality of compartment spaces 221, together on the upstream side of the second communication passage 52 in the flow direction of the heat medium.

The rest of the present embodiment, which is other than the above-described points, is the same as that of the second embodiment. Furthermore, according to the present embodiment, the advantages, which are achieved by the common configuration that is common to the second embodiment described above, can be obtained in the same manner as in the second embodiment.

Fifth Embodiment

Next, a fifth embodiment will be described. In the present embodiment, points, which are different from the fourth embodiment described above, will be mainly described.

Figure 12:
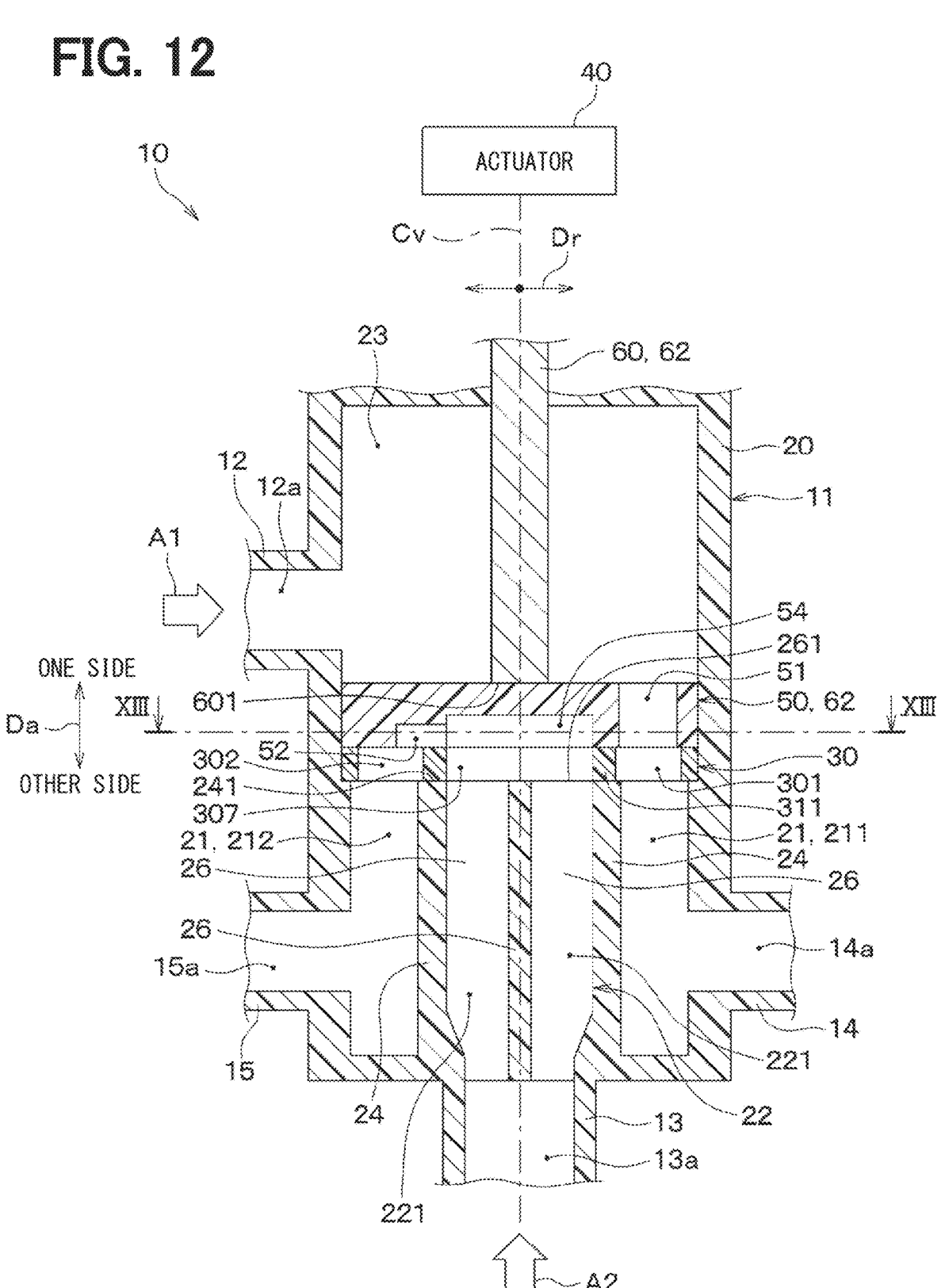
FIG. 12 is a longitudinal cross-sectional view corresponding to FIG. 1, schematically showing a structure of a flow path switch valve according to a fifth embodiment.
Figure 13:
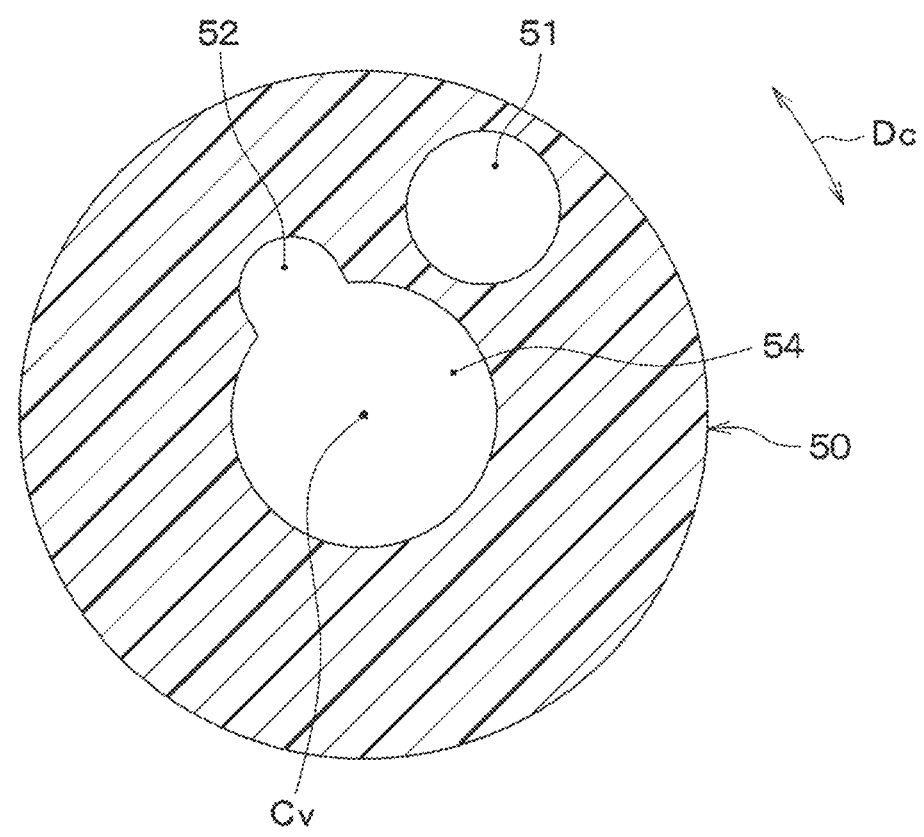
FIG. 13 is a cross-sectional view taken along line XIII-XIII in FIG. 12, showing a rotor alone according to a fifth embodiment.

As shown in FIGS. 12 and 13, the rotor 50 of the present embodiment has a relay space 54 which is recessed on the rotor 50 from the other side toward the one side in the valve axial direction Da. The relay space 54 has the same shape as that of the seventh flow hole 307 of the stator 30 in the view taken in the valve axial direction Da, specifically the circular shape centered on the operational central axis Cv. The entirety of the relay space 54 overlaps the entirety of the seventh flow hole 307 in the view taken in the valve axial direction Da.

That is, in the rotor 50, although an end of the relay space 54, which faces the other side in the valve axial direction Da, is opened, another end of the relay space 54, which faces the one side in the valve axial direction Da, is closed. The relay space 54 is communicated with the seventh flow hole 307 of the stator 30 regardless of the rotational position of the rotor 50. Therefore, the seventh flow hole 307 and the relay space 54 are formed as one space located in the flow path of the heat medium between the second space 22 and the second communication passage 52 of the rotor 50.

Furthermore, in the present embodiment, although the second communication passage 52 of the rotor 50 is recessed on the rotor 50 from the other side toward the one side in the valve axial direction Da like in the fourth embodiment, the second communication passage 52 of the present embodiment is communicated with the relay space 54. Specifically, the second communication passage 52 of the present embodiment is joined to the relay space 54 from the radially outer side of the relay space 54 in the valve radial direction Dr. In other words, the second communication passage 52 extends outward in the valve radial direction Dr from an outer periphery of the relay space 54.

Since the relay space 54 and the second communication passage 52 are formed in this manner, the seventh flow hole 307 of the stator 30 and the relay space 54 of the rotor 50 serve as the merging passage that communicates the plurality of compartment spaces 221 to each other in the present embodiment. Therefore, in the flow path which extends from the second connection port 13a to the second communication passage 52, the heat medium is conducted through the second connection port 13a and is divided into the plurality of flows, which respectively flow in the plurality of compartment spaces 221, and the seventh flow hole 307 and the relay space 54 are configured to merge the plurality of flows of the heat medium, which respectively flow in the plurality of compartment spaces 221, together on the upstream side of the second communication passage 52 in the flow direction of the heat medium.

The rest of the present embodiment, which is other than the above-described points, is the same as that of the fourth embodiment. Furthermore, in the present embodiment, the advantages, which are achieved by the common configuration that is common to the fourth embodiment described above, can be obtained in the same manner as in the fourth embodiment.

Sixth Embodiment

Next, a sixth embodiment will be described. In the present embodiment, points, which are different from the first embodiment, will be mainly described.

Figure 14:
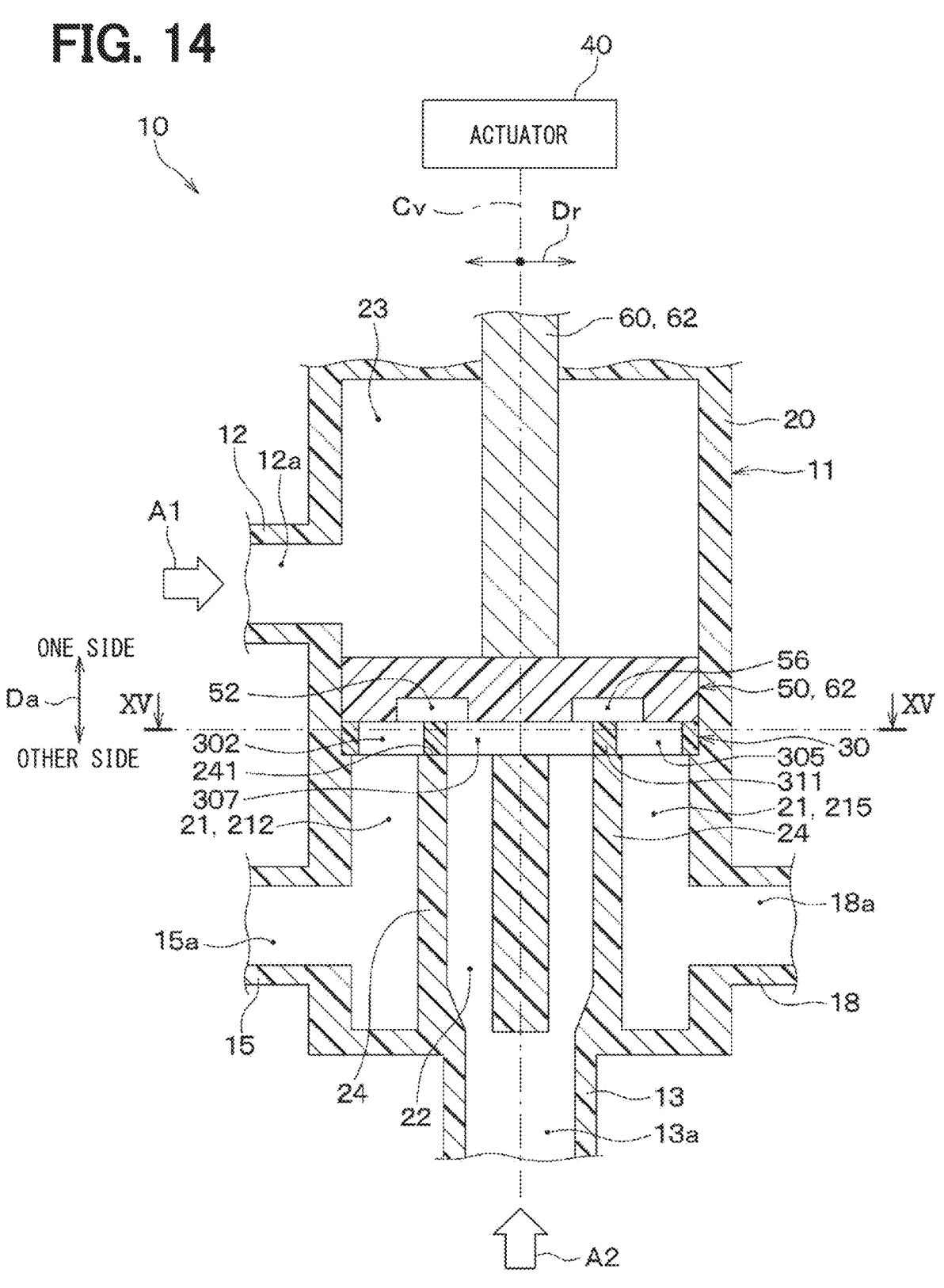
FIG. 14 is a longitudinal cross-sectional view corresponding to FIG. 1, schematically showing a structure of a flow path switch valve according to a sixth embodiment.
Figure 15:
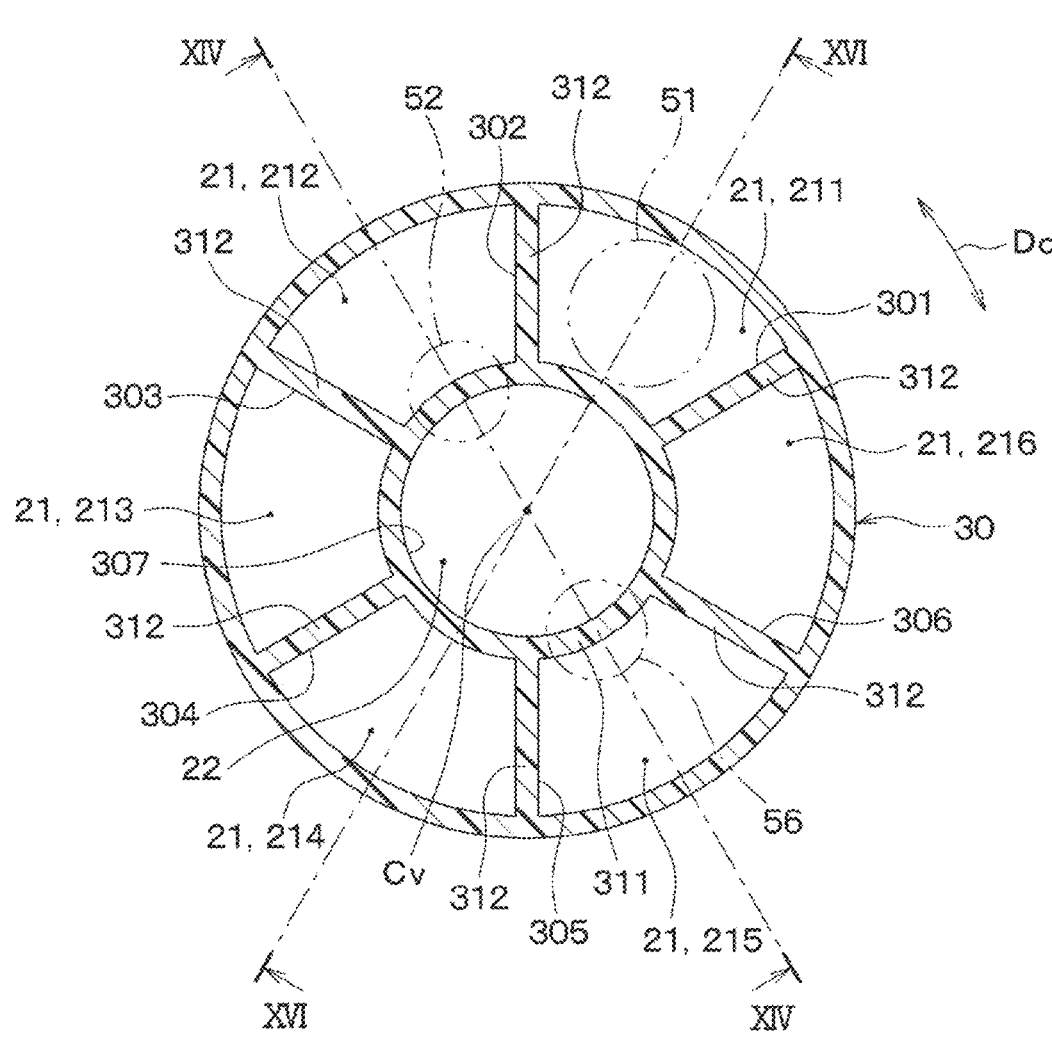
FIG. 15 is a cross-sectional view taken along line XV-XV in FIG. 14, corresponding to FIG. 4 and showing a stator alone according to the sixth embodiment.
Figure 16:
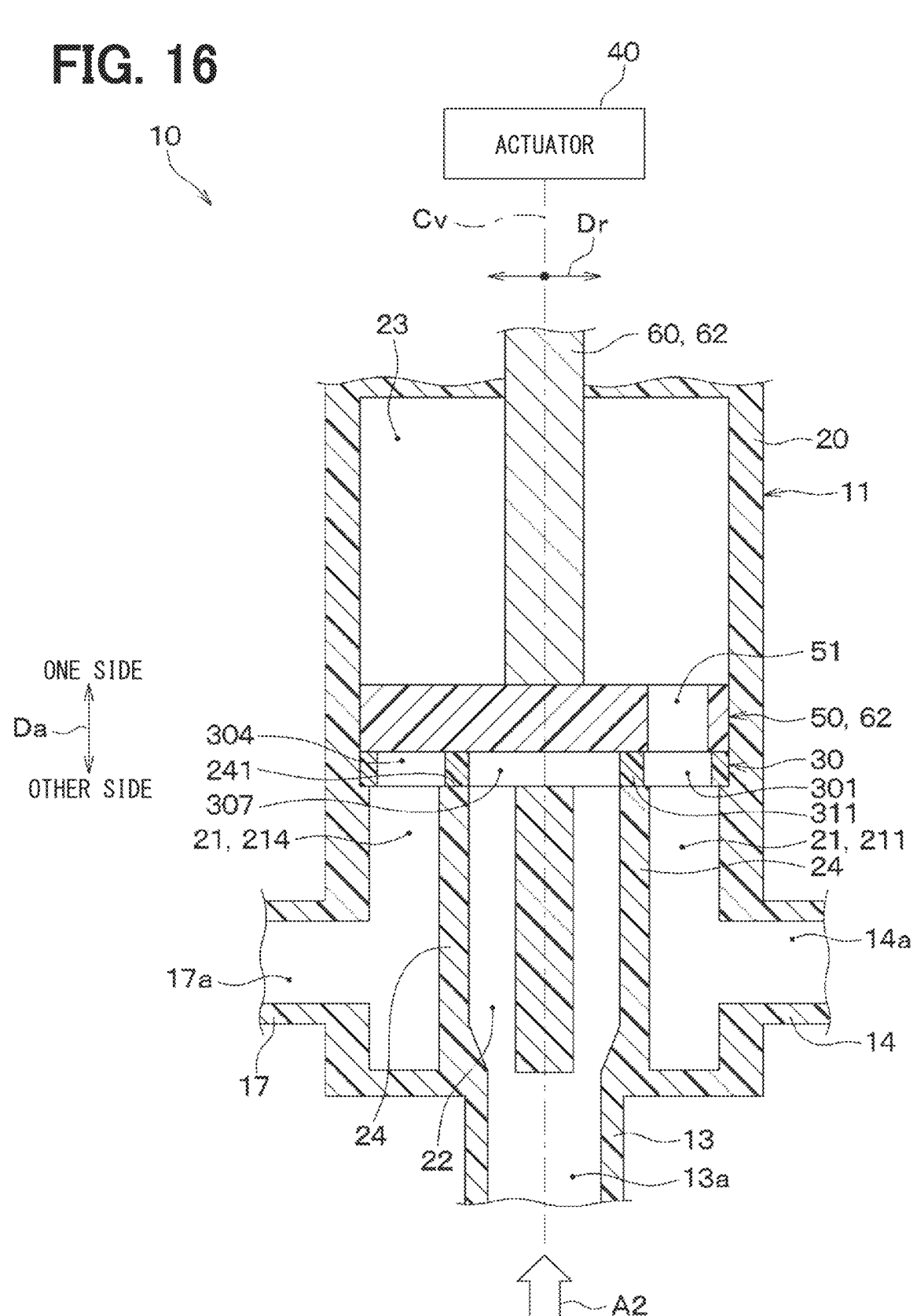
FIG. 16 is a cross-sectional view schematically showing a cross-section taken along line XVI-XVI in FIG. 15 according to the sixth embodiment.

As shown in FIGS. 14 to 16, the rotor 50 of the present embodiment has a third communication passage 56 in addition to the first communication passage 51 and the second communication passage 52. Furthermore, although the rotor 50 is not shown in FIG. 15, the first to third communication passages 51, 52, 56 are respectively indicated by a dot-dot-dash line (i.e., an imaginary line) in FIG. 15. FIG. 14 is a cross-sectional view taken along line XIV-XIV in FIG. 15.

Although the location of the third communication passage 56 is different from the location of the second communication passage 52, a shape of the third communication passage 56 is the same as the shape of the second communication passage 52. Specifically, the third communication passage 56 is in a form of a recess that is recessed on the rotor 50 from the other side toward the one side in the valve axial direction Da like the second communication passage 52. That is, in the rotor 50, although an end of the third communication passage 56, which faces the other side in the valve axial direction Da, is opened, another end of the third communication passage 56, which faces the one side in the valve axial direction Da, is closed. Furthermore, the third communication passage 56 extends from the inner side of the primary partition 24 to the outer side of the primary partition 24 in the valve radial direction Dr.

Therefore, regardless of the rotational position of the rotor 50, the third communication passage 56 is placed on the one side relative to the first space 21 and the second space 22 in the valve axial direction Da and overlaps with both the first space 21 and the second space 22 in the valve axial direction Da. With this configuration, in response to the rotation of the rotor 50, the rotor 50 communicates a corresponding one of the first to sixth subspaces 211-216, which overlaps with the third communication passage 56 in the view taken in the valve axial direction Da, to the second space 22.

Furthermore, in the view taken in the valve axial direction Da, the rotor 50 blocks a flow of the heat medium in remaining subspaces, which are not communicated with any one of the first to third communication passages 51, 52, 56, among the first to sixth subspaces 211-216.

Because of the above-described configuration, in response to the movement of the rotor 50 relative to the housing 11, the rotor 50 changes the subspace to be communicated with the third space 23 through the first communication passage 51 among the first to sixth subspaces 211-216. At the same time, the rotor 50 changes the subspace to be communicated with the second space 22 through the second communication passage 52 among the first to sixth subspaces 211-216. The way of changing the communication relationships through the first and second communication passages 51, 52 is the same as that of the first embodiment. In the present embodiment, in response to the movement of the rotor 50 relative to the housing 11, the rotor 50 changes the subspace to be communicated with the second space 22 through the third communication passage 56 among the first to sixth subspaces 211-216.

Furthermore, the location of the first communication passage 51, the location of the second communication passage 52 and the location of the third communication passage 56 in the valve circumferential direction Dc are displaced from each other. In the present embodiment, for example, the location of the third communication passage 56 is diametrically opposite to the second communication passage 52 about the operational central axis Cv.

Therefore, among the first to sixth subspaces 211-216, the subspace communicated with the third space 23 through the first communication passage 51, the subspace communicated with the second space 22 through the second communication passage 52, and the subspace communicated with the second space 22 through the third communication passage 56 are different from each other.

For example, at the locations of the first to third communication passages 51, 52, 56 shown in FIG. 15, although the first subspace 211 is communicated with the third space 23 through the first communication passage 51, the first subspace 211 is not communicated with the second space 22. Furthermore, although the second subspace 212 is communicated with the second space 22 through the second communication passage 52, the second subspace 212 is not communicated with the third space 23. Furthermore, although the fifth subspace 215 is communicated with the second space 22 through the third communication passage 56, the fifth subspace 215 is not communicated with the third space 23.

(1) As described above, according to the present embodiment, as shown in FIGS. 14 to 16, the rotor 50 has the third communication passage 56 in addition to the first communication passage 51 and the second communication passage 52. In response to the movement of the rotor 50 relative to the housing 11, the rotor 50 also changes the subspace to be communicated with the second space 22 through the third communication passage 56 among the first to sixth subspaces 211-216.

Therefore, the flow of the heat medium, which flows into the second space 22, can be split into the plurality of flows of the heat medium which are discharged from the flow path switch valve 10.

The rest of the present embodiment, which is other than the above-described points, is the same as that of the first embodiment. Furthermore, in the present embodiment, the advantages, which are achieved by the common configuration that is common to the first embodiment described above, can be obtained in the same manner as in the first embodiment.

Although the present embodiment is a modification based on the first embodiment, it is possible to combine the present embodiment with any one of the second to fifth embodiments described above.

Other Embodiments (1) In each of the embodiments described above, the fluid, which flows through the flow path switch valve 10, is the heat medium. Alternatively, the fluid may be another type of fluid that is other than the heat medium. Furthermore, the fluid, which flows through the flow path switch valve 10, may be a gas rather than the liquid.

(2) In each of the embodiments described above, the flow path switch valve 10 is installed in, for example, the hybrid vehicle, but the application of the flow path switch valve 10 is not limited to the vehicle use.

(3) In each of the embodiments described above, as shown in FIG. 1, the flow path switch valve 10 includes the actuator 40. However, this is only one example. For example, the flow path switch valve 10 may not include the actuator 40 and may rotate the rotor 50 and the shaft 60 by an external drive source that is placed at the outside of the flow path switch valve 10.

(4) In each of the embodiments described above, as shown in FIGS. 1 and 2, the flow path switch valve 10 is the eight-way valve. Alternatively, the flow path switch valve 10 may be a multi-way valve, in which the number of the ports is equal to or smaller than seven, or a multi-way valve, in which the number of the ports is equal to or larger than nine.

(5) In each of the embodiments described above, the stator 30 and the rotor 50 shown in FIG. 1 are both made of the resin. However, there is no limitation on the material of the stator 30 and the material of the rotor 50. For example, one or both of the stator 30 and the rotor 50 may be made of ceramic.

(6) In the first embodiment described above, as shown in FIG. 1, although the flow path switch valve 10 includes the stator 30, the flow path switch valve 10 may not include the stator 30 if the primary partition 24 and the secondary partitions 25 have sufficient sliding performance relative to the rotor 50. When there is no stator 30 as such, the rotor 50 contacts the primary partition 24 and the secondary partitions 25 from the one side in the valve axial direction Da and slides relative to the primary partition 24 and the secondary partitions 25 in response to the rotation of the rotor 50.

(7) In each of the embodiments described above, as shown in FIGS. 1 and 2, the center of rotation of the rotor 50 and the central axis of the primary partition 24 coincide with each other since the center of rotation of the rotor 50 and the central axis of the primary partition 24 coincide with the operational central axis Cv. However, this is only one example. For example, the primary partition 24 may be arranged so that the central axis of the primary partition 24 slightly deviates from the operational central axis Cv which is the center of rotation of the rotor 50.

(8) In each of the embodiments described above, as shown in FIGS. 1 and 2, the first communication passage 51 of the rotor 50 is formed as the through-hole which extends through the rotor 50 in the valve axial direction Da. However, this is only one example. For example, the first communication passage 51 may be provided as a cutout groove formed to cut into the rotor 50 from the radially outer side toward the radially inner side of the rotor 50. Even in this case, the first communication passage 51 still extends through the rotor 50 in the valve axial direction Da.

(9) In each of the embodiments described above, as shown in FIGS. 1 and 2, the rotor 50 changes the flow path of the heat medium in response to the rotation of the rotor 50 about the operational central axis Cv. However, this is only one example. For example, it may be assumed that the primary partition 24 is not in the cylindrical tubular form but extends linearly in a predetermined direction perpendicular to the valve axial direction Da, and that the first to sixth subspaces 211-216 are linearly arranged in the predetermined direction along this primary partition 24. In that case, the rotor 50 can change the flow path of the heat medium through the reciprocating motion of the rotor 50 in the predetermined direction.

(10) In the second embodiment described above, as shown in FIGS. 6 and 7, the number of the spatial inner walls 26, which are respectively arranged in the radiating form, is four. However, this is only one example. For example, it may be assumed that there is provided only one spatial inner wall (single spatial inner wall) 26 that bisects the second space 22 in the view taken in the valve axial direction Da.

(11) In the second embodiment described above, as shown in FIG. 5, the other end 601 of the shaft 60 contacts the one wall ends 261 of the spatial inner walls 26 in the valve axial direction Da. However, this is only one example. For example, it may be assumed that as shown in FIG. 17, the other end 601 of the shaft 60 is spaced from the one wall ends 261 of the spatial inner walls 26 toward the one side in the valve axial direction Da.

Figure 17:
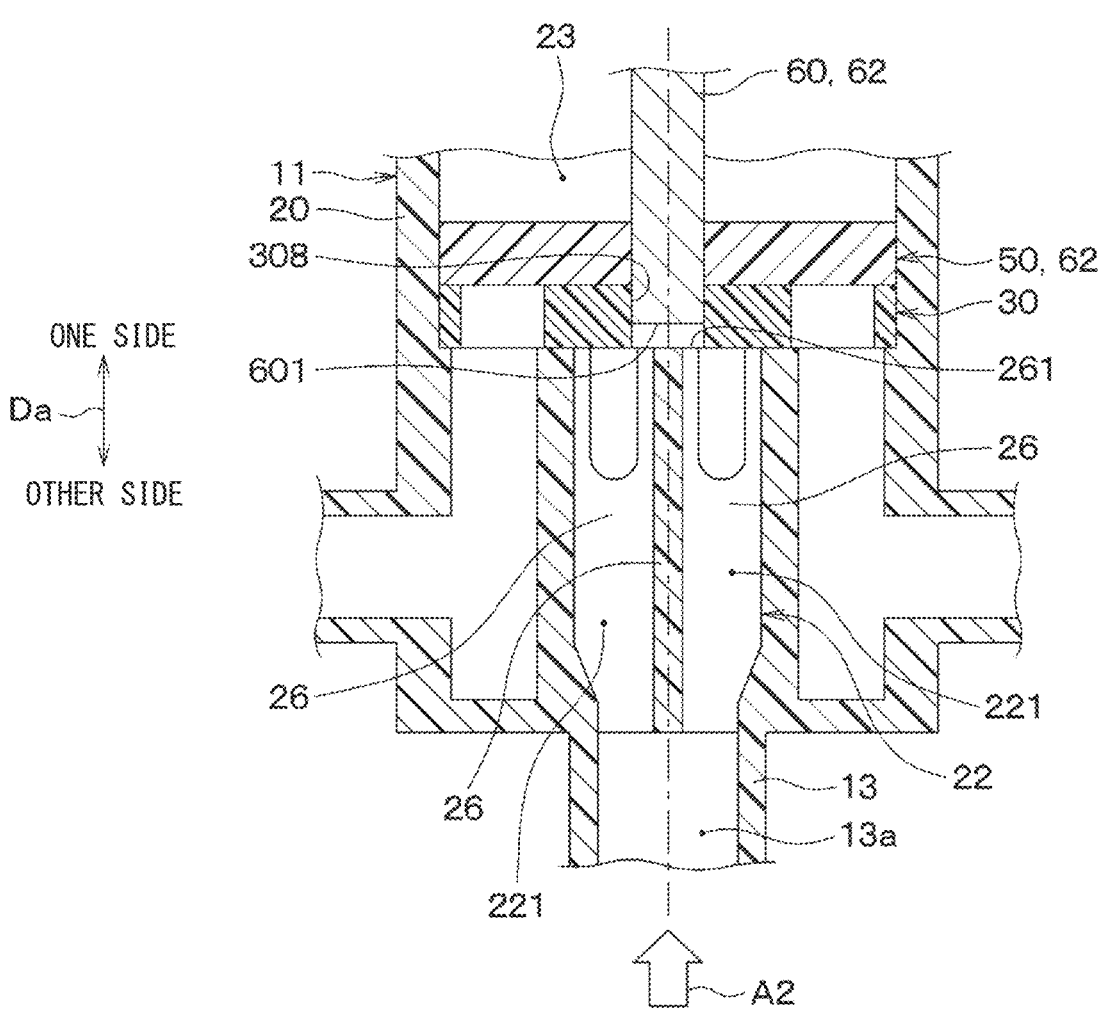
FIG. 17 is a cross-sectional view schematically showing a longitudinal cross-section of a flow switch valve of a modification of the second embodiment, indicating a stator and its periphery of the flow path switch valve.

In the example shown in FIG. 17, the stator 30 has a shaft insertion hole 308 which extends through the stator 30 in the valve axial direction Da and has a circular cross-section, and the other end 601 of the shaft 60 is inserted into and is rotatably fitted into the shaft insertion hole 308. Therefore, the displacement of the shaft 60 in the valve radial direction Dr is restrained by the stator 30 at the other end 601 of the shaft 60, and the shaft 60 can be rotated while being guided by the stator 30. Since FIG. 17 is a cross-sectional view in which the location of the cross-section of the flow path switch valve 10 is different from that of FIG. 5, the first and second communication passages 51, 52 of the rotor 50 and the seventh flow hole 307 of the stator 30 are not shown in FIG. 17, but are formed in the same manner as in the second embodiment.

(12) In the second embodiment, as shown in FIG. 5, the shaft 60 projects from the rotor 50 to enter the seventh flow hole 307 of the stator 30 and is in contact with the spatial inner walls 26 in the valve axial direction Da. However, this is only one example. For example, the shaft 60 may not project from the rotor 50, and a portion of each spatial inner wall 26 may project toward the one side in the valve axial direction Da and enter the seventh flow hole 307 and contact the other end 601 of the shaft 60.

(13) The present disclosure is not limited to the above-described embodiments and may be implemented in various variations. Further, the above embodiments are not unrelated to each other and can be appropriately combined unless the combination is clearly impossible.

Needless to say, in each of the embodiments described above, the elements of the embodiment are not necessarily essential except when it is clearly indicated that they are essential and when they are clearly considered to be essential in principle. In each of the above embodiments, when a numerical value such as the number, numerical value, amount, range or the like of the constituent elements of the embodiment is mentioned, the present disclosure should not be limited to such a numerical value unless it is clearly stated that it is essential and/or it is required in principle. In each of the above embodiments, when the material, the shape, the positional relationship or the like of the constituent elements of the embodiment is mentioned, the present disclosure should not be limited the material, the shape, the positional relationship or the like unless it is clearly stated that it is essential and/or it is required in principle.

What is claimed is:

1. A flow path switch valve comprising:
a housing that internally forms:
   a first space and a second space that are configured to conduct a fluid; and
   a third space that is placed on one side relative to the first space and the second space in one direction and is configured to conduct the fluid, wherein the housing includes:
   a primary partition that partitions between the first space and the second space; and
   a plurality of secondary partitions that partition the first space into a plurality of subspaces, wherein the plurality of subspaces are arranged adjacent to the second space, and the primary partition is interposed between: the plurality of subspaces; and the second space; and
a valve element that is placed at an inside of the housing and partitions between: the third space; and the first space and the second space, wherein:
the valve element has:
   a first communication passage that is placed on the one side relative to the first space in the one direction and overlaps with the first space in the one direction, wherein the first communication passage extends through the valve element in the one direction; and
   a second communication passage that is recessed on the valve element from another side, which is opposite to the one side in the one direction, toward the one side in the one direction, wherein the second communication passage is placed on the one side relative to the first space and the second space in the one direction and overlaps with the first space and the second space in the one direction;
the plurality of subspaces, the second space and the third space are respectively configured to be connected to an outside of the housing; and
in response to movement of the valve element relative to the housing, the valve element changes a subspace to be communicated with the third space through the first communication passage among the plurality of subspaces and also changes another subspace to be communicated with the second space through the second communication passage among the plurality of subspaces.

2. The flow path switch valve according to claim 1, wherein:

the primary partition is shaped in a tubular form to surround the second space;

the plurality of subspaces are placed on a radially outer side of the primary partition and are arranged in a circumferential direction of the primary partition; and the valve element is configured to be rotated about an operational central axis which is located on a radially inner side of the primary partition and extends in the one direction.

3. The flow path switch valve according to claim 2, comprising a shaft that extends from the valve element toward the one side in the one direction and is coupled to the valve element in a manner that limits relative rotation of the shaft relative to the valve element, wherein the shaft is configured to be rotated integrally with the valve element about the operational central axis; wherein:

the housing includes at least one spatial inner wall that is placed in the second space, wherein the at least one spatial inner wall has one wall end which faces the one side in the one direction; and a portion of the one wall end of the at least one spatial inner wall is configured to contact a portion of a rotatable unit, which is formed by the valve element and the shaft, to receive the shaft from the another side relative to the shat in the one direction.

4. The flow path switch valve according to claim 3, wherein:

the housing includes a connection port forming portion at which a connection port is formed, wherein the connection port is communicated with the second space and is configured to be connected to the outside of the housing;

the at least one spatial inner wall partitions the second space into a plurality of compartment spaces;

a merging passage is formed in a flow path which is configured to conduct the fluid from the connection port to the second communication passage at the inside of the housing, wherein the merging passage communicates the plurality of compartment spaces with each other; and in the flow path, the fluid is conducted through the connection port and is divided into a plurality of flows of the fluid, which respectively flow in the plurality of compartment spaces, and the merging passage is configured to merge the plurality of flows of the fluid, which respectively flow in the plurality of compartment spaces, together on an upstream side of the second communication passage in a flow direction of the fluid.

5. The flow path switch valve according to claim 1, wherein:

the valve element has a third communication passage that is recessed on the valve element from the another side toward the one side in the one direction, in addition to the first communication passage and the second communication passage, wherein the third communication passage is placed on the one side relative to the first space and the second space in the one direction and overlaps with the first space and the second space in the one direction; and in response to the movement of the valve element relative to the housing, the valve element changes a further subspace to be communicated with the second space through the third communication passage among the plurality of subspaces.

* * * * *